US010740936B2

(12) United States Patent
Irie et al.

(10) Patent No.: US 10,740,936 B2
(45) Date of Patent: Aug. 11, 2020

(54) TROLLEY-WIRE DISPLAY DEVICE, TROLLEY-WIRE DISPLAY SYSTEM, AND TROLLEY-WIRE DISPLAY DATA CREATION METHOD

(71) Applicant: Mitsubishi Electric Corporation, Chiyoda-ku, Tokyo (JP)

(72) Inventors: Megumi Irie, Tokyo (JP); Katsuyuki Kamei, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/348,382

(22) PCT Filed: Nov. 14, 2016

(86) PCT No.: PCT/JP2016/083724
§ 371 (c)(1),
(2) Date: May 8, 2019

(87) PCT Pub. No.: WO2018/087931
PCT Pub. Date: May 17, 2018

(65) Prior Publication Data
US 2020/0066011 A1 Feb. 27, 2020

(51) Int. Cl.
*G06T 11/20* (2006.01)
*B60M 1/12* (2006.01)
*G01B 11/14* (2006.01)

(52) U.S. Cl.
CPC ............ *G06T 11/206* (2013.01); *B60M 1/12* (2013.01); *G01B 11/14* (2013.01)

(58) Field of Classification Search
CPC ......... G06T 11/206; G01B 11/14; B60M 1/12
See application file for complete search history.

(56) References Cited

U.S. PATENT DOCUMENTS 8,249,304 B2 * 8/2012 Chang ................... G01B 11/14
382/106
10,012,495 B2 * 7/2018 Bon ................... G01B 9/02098
(Continued)

FOREIGN PATENT DOCUMENTS

EP 3067851 A1 9/2016
JP 2007248341 A 9/2007
(Continued)

OTHER PUBLICATIONS

International Search Report (PCT/ISA/210) dated Jan. 17, 2017, by the Japan Patent Office as the International Searching Authority for International Application No. PCT/JP2016/083724.

*Primary Examiner* — Ryan R Yang
(74) *Attorney, Agent, or Firm* — Buchanan Ingersoll & Rooney PC

(57) ABSTRACT

In a trolley-wire display device, a display reference point of point-group data is set for each point on a trolley wire having a height and a displacement measured based on a reference obtained from rails. First and second points on a track center line are used to calculate a first distance, and a third distance based on the first distance and a second distance. The first point corresponds to the display reference point. The second point corresponds to each point on the trolley wire. The first distance is a distance from the first point to each second point. The second distance is a distance from a positional start point to the first point. The third distance is a distance from the start point to each second point, and is used to create display data for displaying a height and a displacement of each point on the trolley wire.

25 Claims, 31 Drawing Sheets

(56) References Cited

U.S. PATENT DOCUMENTS

| | | |
|---|---|---|
| 2017/0144682 A1 | 5/2017 | Kamei et al. |
| 2017/0219335 A1 | 8/2017 | Shiraishi et al. |
| 2018/0328714 A1 | 11/2018 | Kamei et al. |

FOREIGN PATENT DOCUMENTS

| | | |
|---|---|---|
| JP | 2008281461 A | 11/2008 |
| WO | 2015068801 A1 | 5/2015 |
| WO | 2015198423 A1 | 12/2015 |
| WO | 2016021224 A1 | 2/2016 |
| WO | 2017103999 A1 | 6/2017 |

\* cited by examiner

| | |
|---|---|
| x COORDINATE VALUE OF $P_1$ | $x_1$ |
| y COORDINATE VALUE OF $P_1$ | $y_1$ |
| z COORDINATE VALUE OF $P_1$ | $z_1$ |
| x COORDINATE VALUE OF $P_2$ | $x_2$ |
| y COORDINATE VALUE OF $P_2$ | $y_2$ |
| z COORDINATE VALUE OF $P_2$ | $z_2$ |
| ⋮ | |
| x COORDINATE VALUE OF $P_K$ | $x_K$ |
| y COORDINATE VALUE OF $P_K$ | $y_K$ |
| z COORDINATE VALUE OF $P_K$ | $z_K$ |

FIG.6

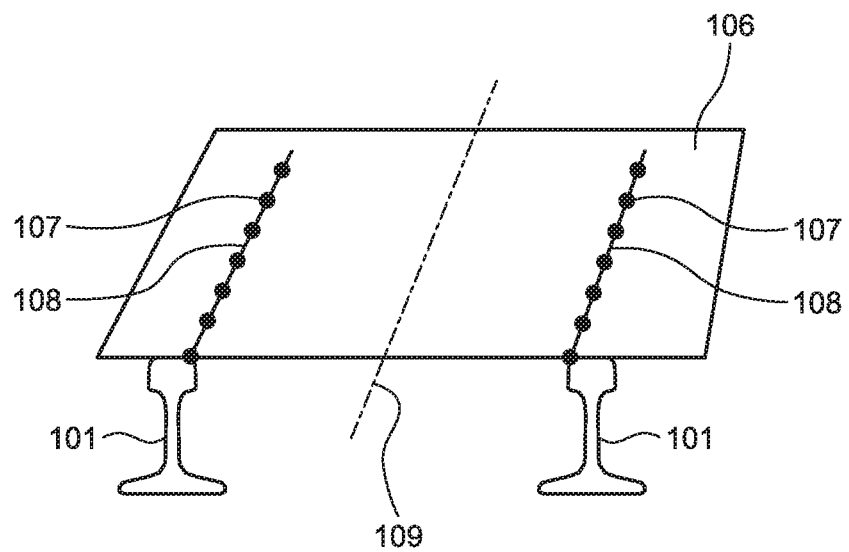

| | |
|---|---|
| x COORDINATE VALUE OF $L_1$ | $xl_1$ |
| y COORDINATE VALUE OF $L_1$ | $yl_1$ |
| z COORDINATE VALUE OF $L_1$ | $zl_1$ |
| x COORDINATE VALUE OF $L_2$ | $xl_2$ |
| y COORDINATE VALUE OF $L_2$ | $yl_2$ |
| z COORDINATE VALUE OF $L_2$ | $zl_2$ |
| ⋮ | |
| x COORDINATE VALUE OF $L_K$ | $xl_K$ |
| y COORDINATE VALUE OF $L_K$ | $yl_K$ |
| z COORDINATE VALUE OF $L_K$ | $zl_K$ |

(b) $107R_i$

| | |
|---|---|
| x COORDINATE VALUE OF $R_1$ | $xr_1$ |
| y COORDINATE VALUE OF $R_1$ | $yr_1$ |
| z COORDINATE VALUE OF $R_1$ | $zr_1$ |
| x COORDINATE VALUE OF $R_2$ | $xr_2$ |
| y COORDINATE VALUE OF $R_2$ | $yr_2$ |
| z COORDINATE VALUE OF $R_2$ | $zr_2$ |
| ⋮ | |
| x COORDINATE VALUE OF $R_K$ | $xr_K$ |
| y COORDINATE VALUE OF $R_K$ | $yr_K$ |
| z COORDINATE VALUE OF $R_K$ | $zr_K$ |

FIG.12

| |
|---|
| x COORDINATE VALUE OF $T_1$  $X_1$ |
| y COORDINATE VALUE OF $T_1$  $Y_1$ |
| z COORDINATE VALUE OF $T_1$  $Z_1$ |
| HEIGHT OF $T_1$  $h_1$ |
| DISPLACEMENT OF $T_1$  $d_1$ |
| x COORDINATE VALUE OF $T_2$  $X_2$ |
| y COORDINATE VALUE OF $T_2$  $Y_2$ |
| z COORDINATE VALUE OF $T_2$  $Z_2$ |
| HEIGHT OF $T_2$  $h_2$ |
| DISPLACEMENT OF $T_2$  $d_2$ |
| ⋮ |
| x COORDINATE VALUE OF $T_H$  $X_H$ |
| y COORDINATE VALUE OF $T_H$  $Y_H$ |
| z COORDINATE VALUE OF $T_H$  $Z_H$ |
| HEIGHT OF $T_H$  $h_H$ |
| DISPLACEMENT OF $T_H$  $d_H$ |

FIG.25
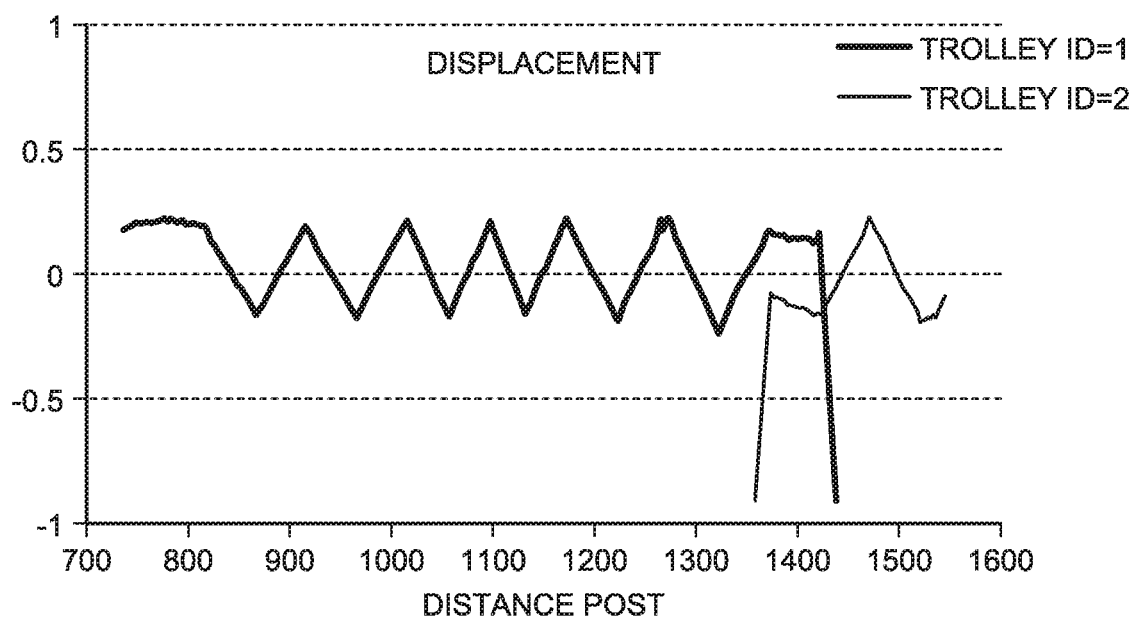
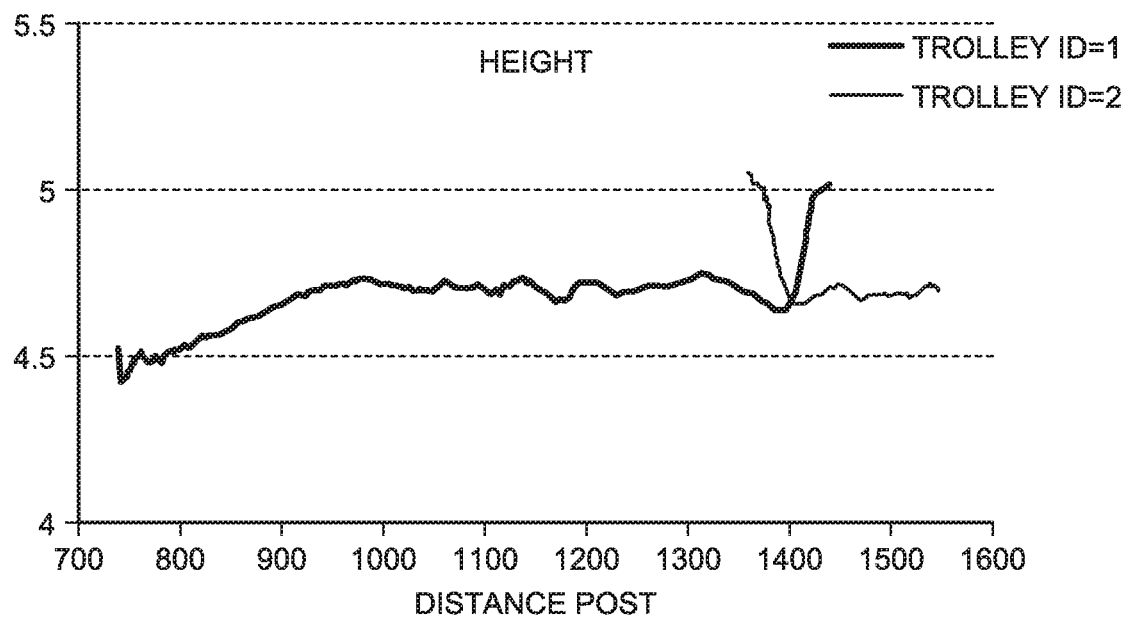

FIG.26
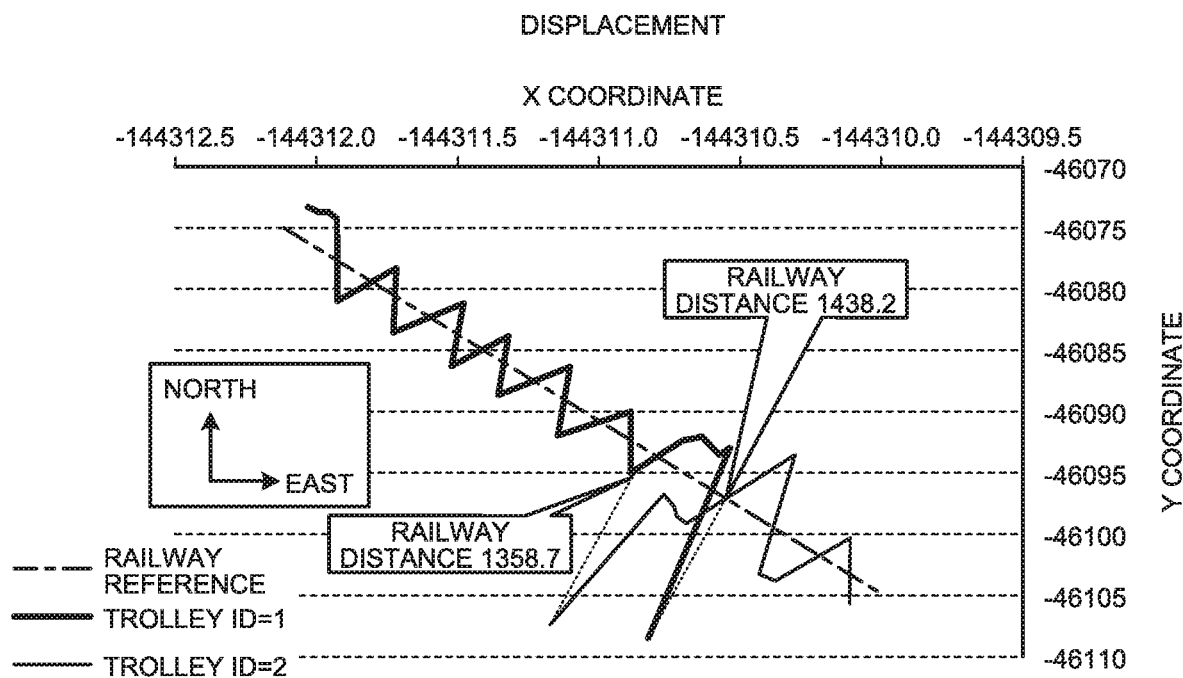
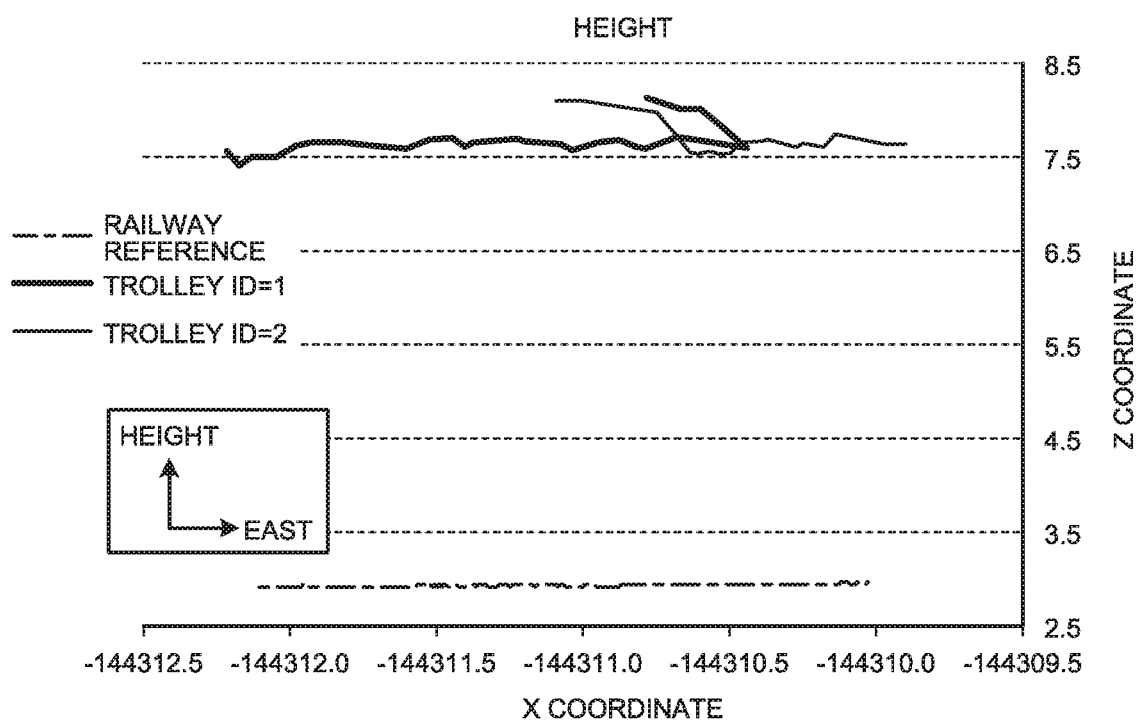

FIG.36
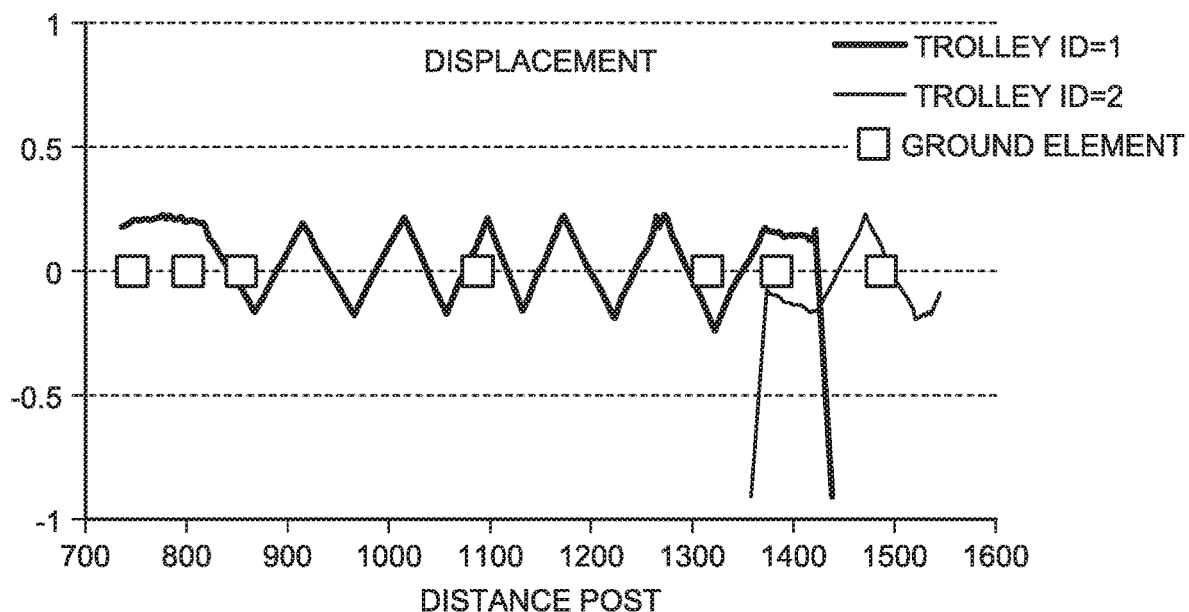
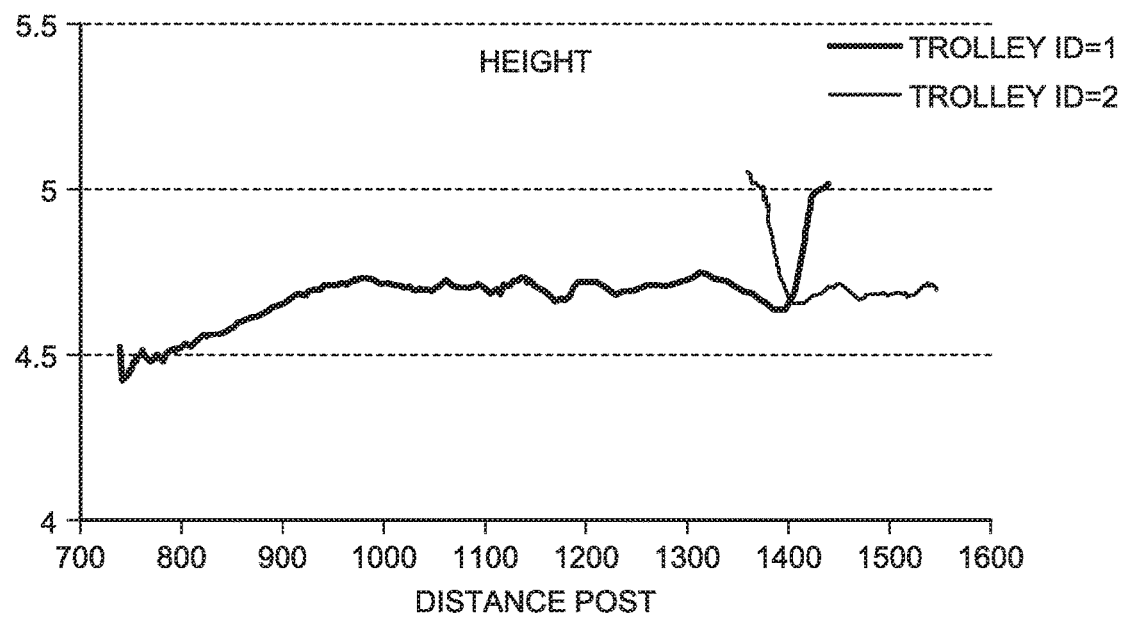

FIG.37
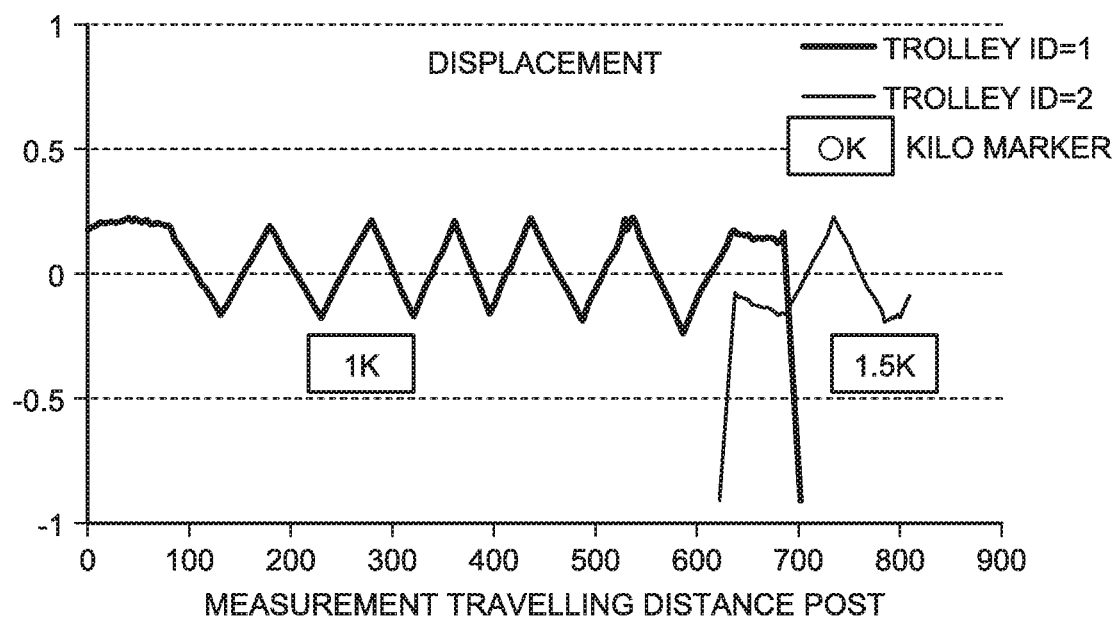
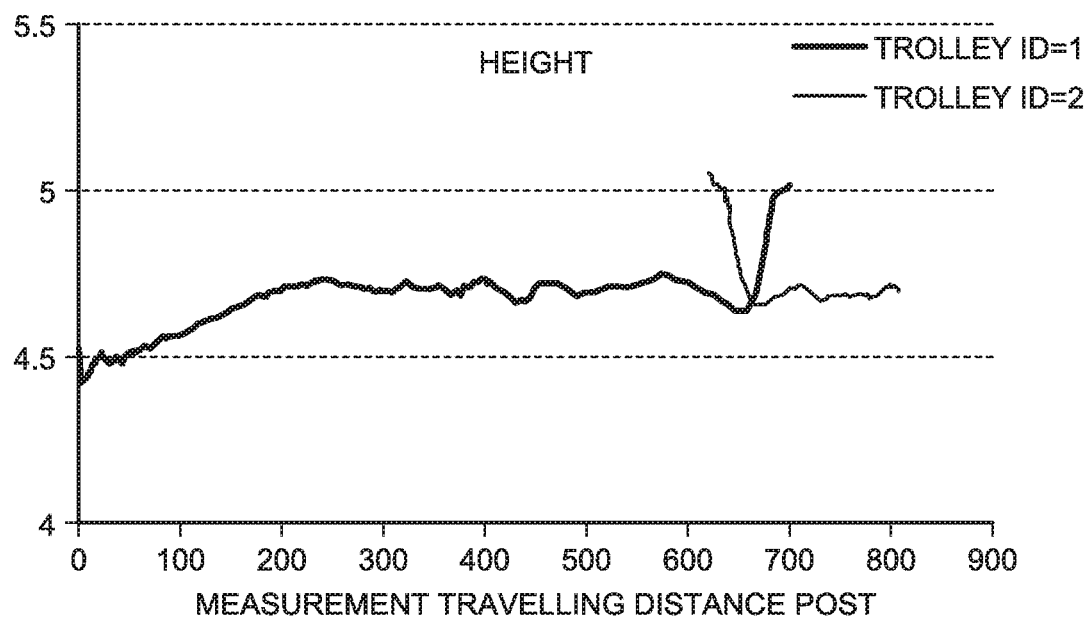

FIG.38
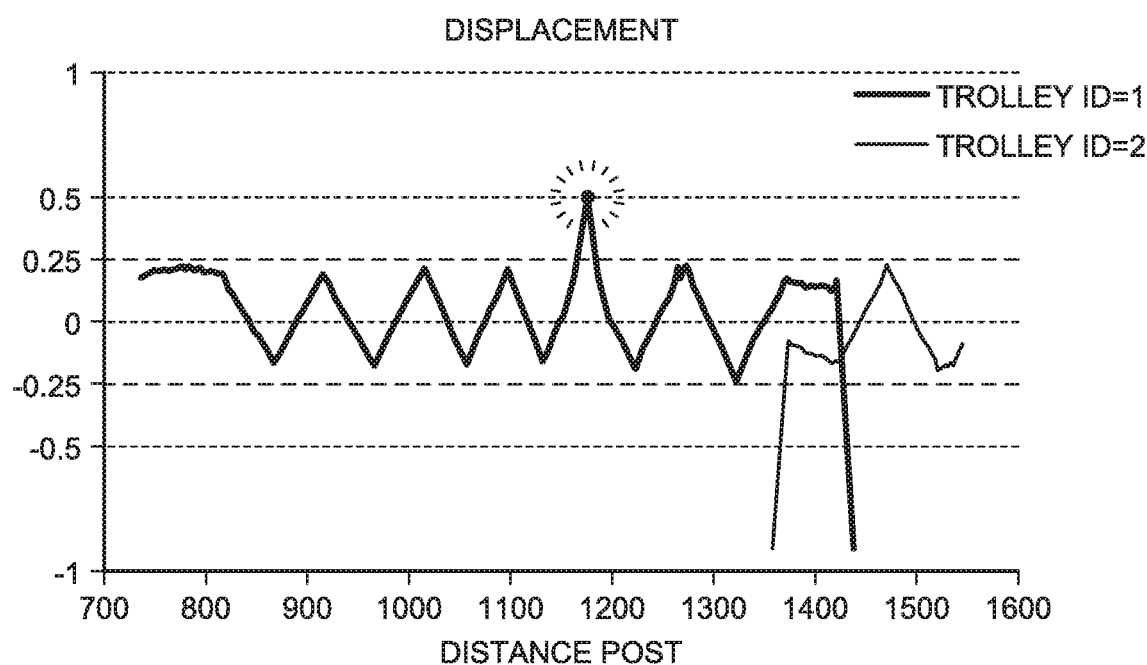
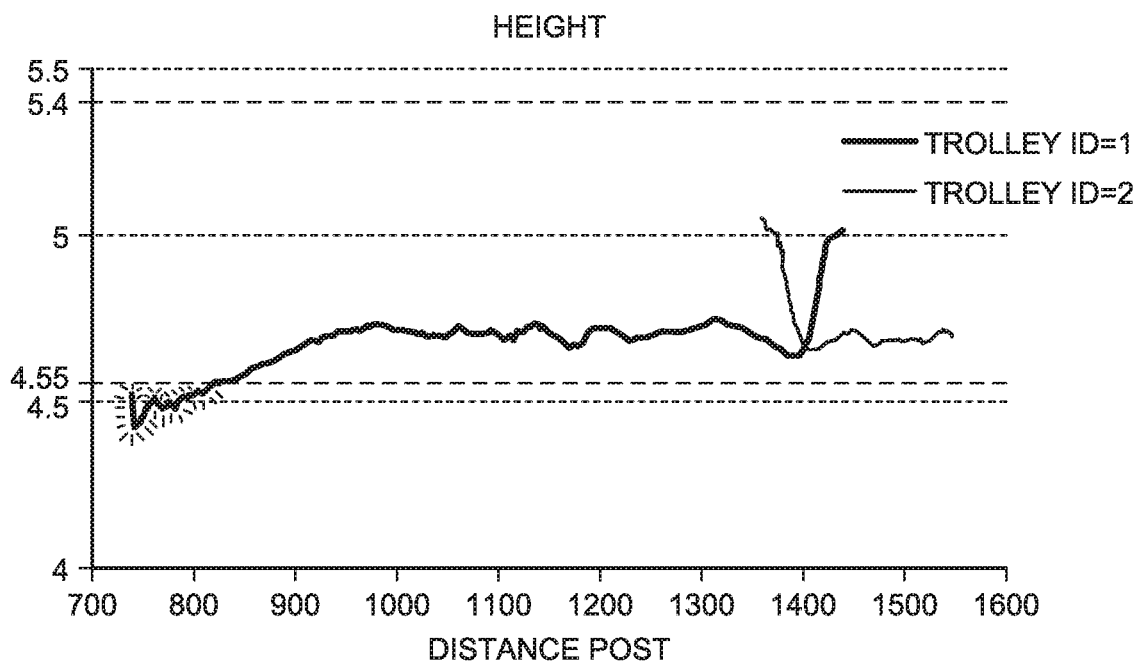

| DISTANCE | HEIGHT | DISPLACEMENT |
|---|---|---|
| ○○○ | 5.5 | – |
| ××× | – | 0.4 |
| △△△ | 5.6 | 0.5 |

FIG.41
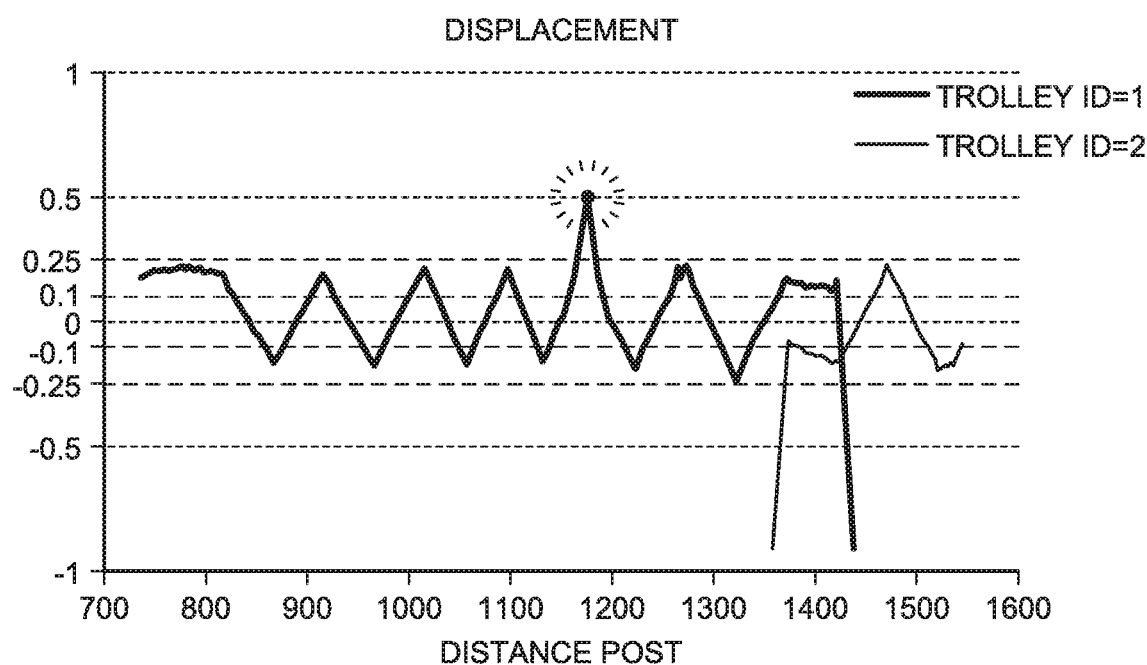
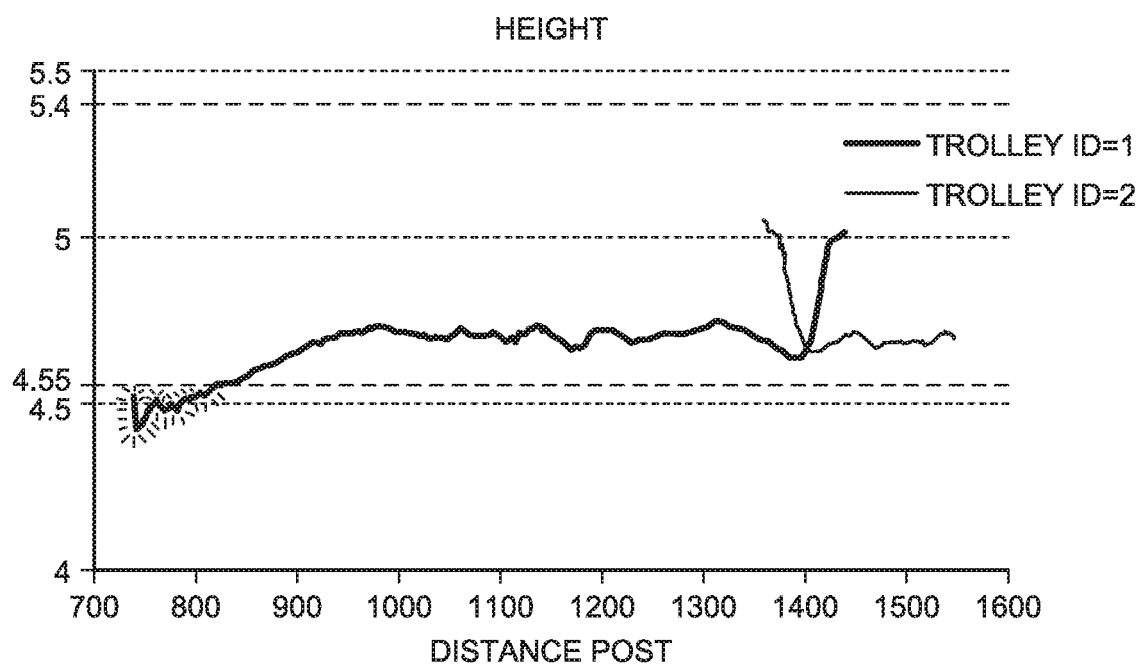

FIG.42
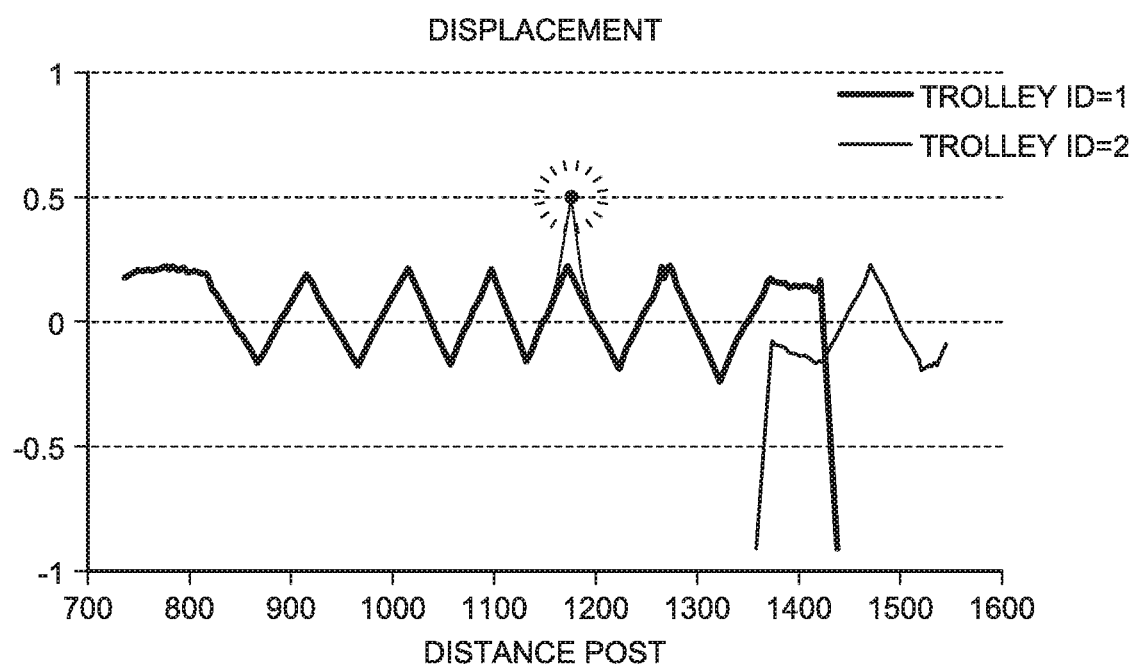
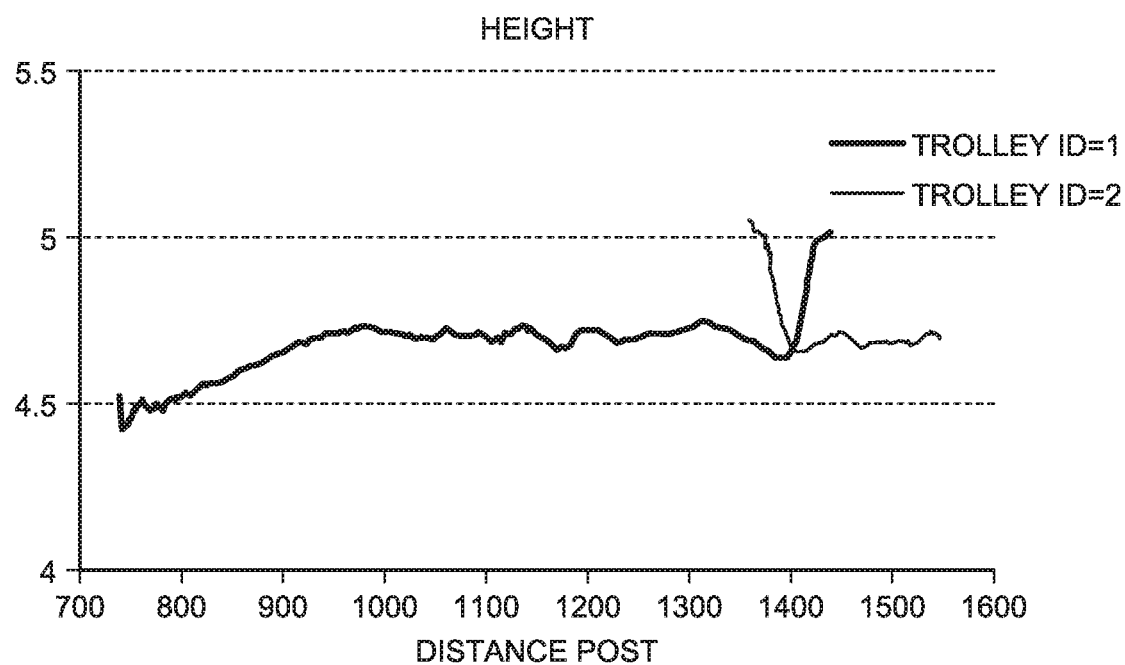

TROLLEY-WIRE DISPLAY DEVICE, TROLLEY-WIRE DISPLAY SYSTEM, AND TROLLEY-WIRE DISPLAY DATA CREATION METHOD

FIELD

The present invention relates to a trolley-wire display device which displays a state of a trolley wire, a trolley-wire display system, and a trolley-wire display data creation method.

BACKGROUND

There is a well-known device that displays a state of a trolley wire for supplying power to a train in association with a display reference expressed in terms of, for example, kilometer. For the technique disclosed in Patent Literature 1, a wearing state of the trolley wire is calculated from an image captured by a line sensor. In accordance with the time of measurement of the trolley wire, then, the wearing state of the trolley wire is associated with kilometer information corresponding to positional information at the time of the measurement of the trolley wire, such that the wearing state of the trolley wire is displayed by the kilometer.

CITATION LIST

Patent Literature

Patent Literature 1: Japanese Patent Application Laid-open No. 2008-281461

SUMMARY

Technical Problem

Generally, the trolley wire should have a specified height and displacement relative to a reference on a track on which a train runs. The above-mentioned conventional technique fails to measure the wearing state of the trolley wire with respect to a distance corresponding to the reference on the track on which the train runs. For this reason, the above technique poses a problem of the failure to accurately express the position of the trolley wire relative to the reference on the track.

The present invention has been made in consideration of the above, and an object of the present invention is to obtain a trolley-wire display device capable of accurately display a position of a trolley wire relative to a reference on a track on which a train runs.

Solution to Problem

To solve the problems and achieve the object, a trolley-wire display device of the present invention comprises a display reference point setting unit to set a display reference point of point-group data for each point on a trolley wire having a height and a displacement that are measured on the basis of a reference obtained from rails defining a track on which a train runs, the display reference point serving as a positional reference used when each point is displayed, the point-group data being an aggregate of points obtained by three-dimensional measurement of a target object, the rails being two in number, the reference obtained from the rails including a track center line located at a center between the two rails and on a rail plane including surfaces of the two rails, the surfaces of the two rails contacting the train. The trolley-wire display device also comprises a distance measurement unit to obtain first and second points on the track center line, calculate a first distance, and calculate a third distance on a basis of the first distance and a second distance, the first point corresponding to the display reference point, the second point corresponding to each point on the trolley wire, the first distance being a distance from the first point to each second point, the second distance being a distance from a positional start point used when each point on the trolley wire is displayed, to the first point, the third distance being a distance from the start point to each second point. The trolley-wire display device further comprises a display control unit to create, on the basis of the third distance, display data for displaying a height and a displacement of each point on the trolley wire corresponding to the second point.

Advantageous Effects of Invention

The present invention provides an effect that the trolley-wire display device can accurately display the position of the trolley wire relative to the reference on the track on which the train runs.

BRIEF DESCRIPTION OF DRAWINGS

FIG. 6 is a conceptual diagram illustrating a process for deriving a track center line in the reference setting unit according to the first embodiment.

FIG. 7 is a diagram illustrating an example of data on rail points held in the rail detection unit according to the first embodiment.

FIG. 12 is a diagram illustrating data on a height and a displacement of a point on the trolley wire which have been measured by the height and displacement measurement unit according to the first embodiment.

FIG. 25 is a diagram illustrating an example of a display screen provided by a trolley-wire display device according to the first embodiment for displaying a height and a displacement of a point on the trolley wire.

FIG. 26 is a diagram illustrating another example of the display screen provided by the trolley-wire display device according to the first embodiment for displaying the height and the displacement of the point on the trolley wire.

FIG. 36 is a diagram illustrating an example of a display screen provided by a trolley-wire display device according to the third embodiment for displaying a height and a displacement of a point on a trolley wire.

FIG. 37 is a diagram illustrating another example of the display screen provided by the trolley-wire display device according to the third embodiment for displaying a height and a displacement of a point on the trolley wire.

FIG. 38 is a diagram illustrating an example of a display screen provided by a trolley-wire display device according to a fourth embodiment for displaying a height and a displacement of a point on a trolley wire.

FIG. 41 is a diagram illustrating another example of the display screen provided by the trolley-wire display device according to the fourth embodiment for displaying the height and the displacement of the point on the trolley wire.

FIG. 42 is a diagram illustrating an example of the display screen provided by a trolley-wire display device according to a fifth embodiment for displaying a height and a displacement of a point on a trolley wire on the bases of new display data defined by a plurality of superposed pieces of display data.

DESCRIPTION OF EMBODIMENTS

Hereinafter, a trolley-wire display device, a trolley-wire display system, and a trolley-wire display data creation method according to embodiments of the present invention will be described in detail with reference to the drawings. The present invention is not limited to the embodiments.

First Embodiment

Figure 1:
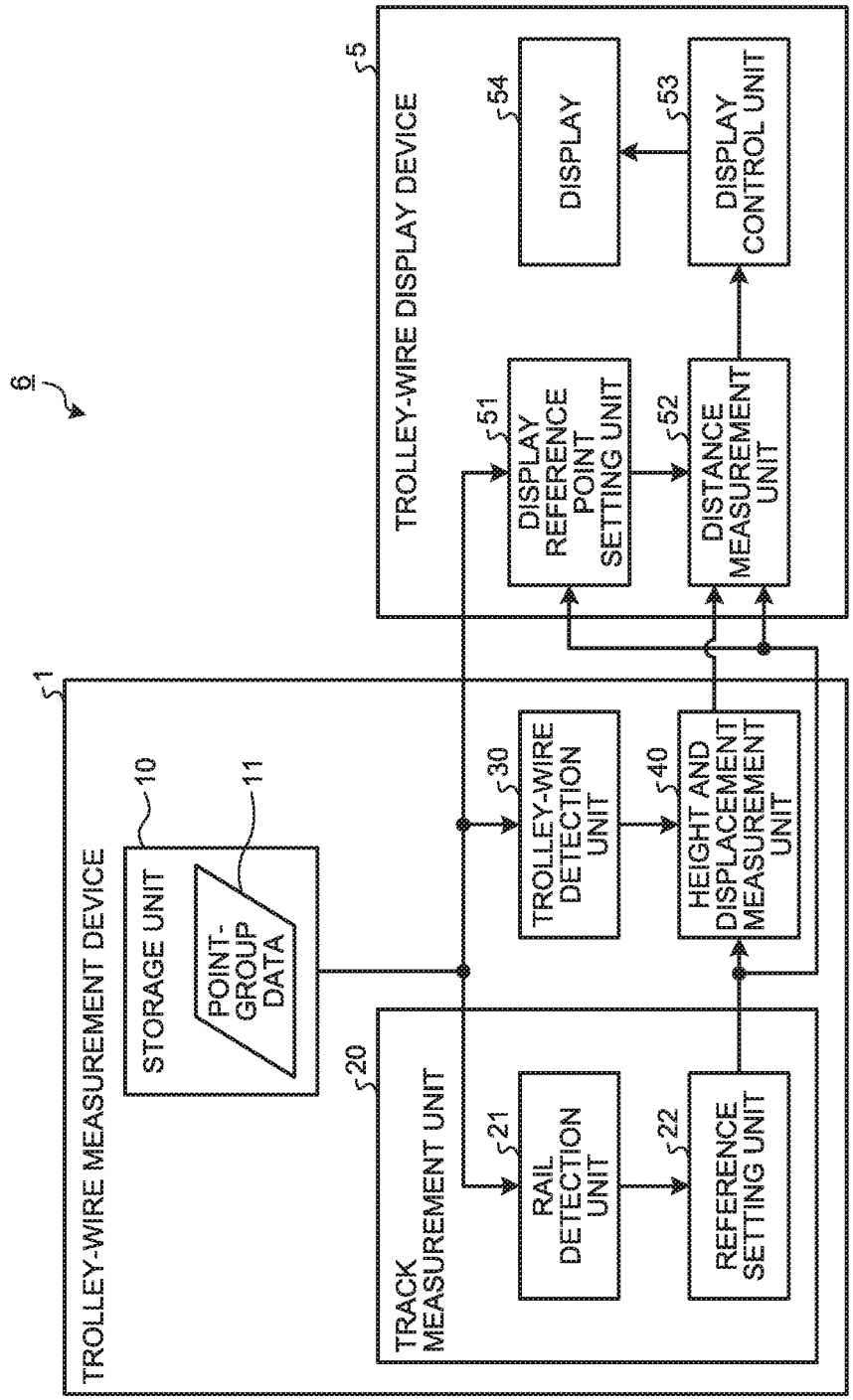
FIG. 1 is a block diagram illustrating a configuration example of a trolley-wire display system according to a first embodiment.

FIG. 1 is a block diagram illustrating a configuration example of a trolley-wire display system 6 according to a first embodiment of the present invention. The trolley-wire display system 6 includes a trolley-wire measurement device 1 and a trolley-wire display device 5. The trolley-wire measurement device 1 measures the position of a trolley wire relative to a reference that is set on the basis of the position of rails that define a track on which a train runs. Specifically, the trolley-wire measurement device 1 measures a height and a displacement of the trolley wire. The trolley-wire display device 5 displays the position of the trolley wire relative to the reference set by the trolley-wire measurement device 1, specifically, the height and the displacement of the trolley wire.

First, a configuration of the trolley-wire measurement device 1 will be described. The trolley-wire measurement device 1 includes a storage unit 10, a track measurement unit 20, a trolley-wire detection unit 30, and a height and displacement measurement unit 40.

Figures 2, 3:
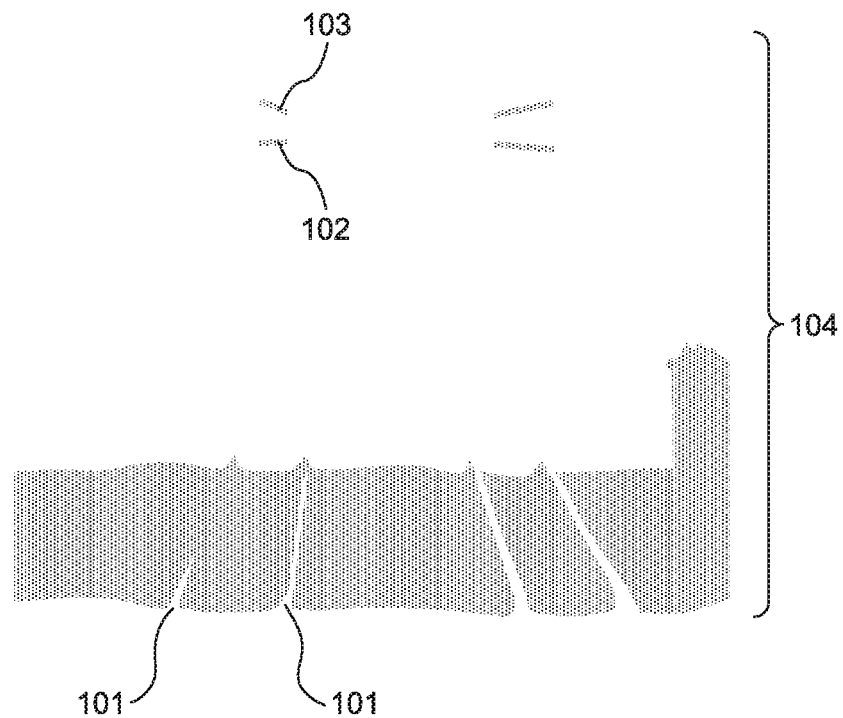
FIG. 2 is a diagram illustrating an example of a three-dimensionally measured target object that is expressed by point-group data stored in a storage unit according to the first embodiment.
FIG. 3 is a diagram illustrating a configuration example of the point-group data stored in the storage unit according to the first embodiment.

The storage unit 10 stores point-group data 11 therein. The point-group data 11, which is an aggregate of points having three-dimensional coordinate values, is a result of a three-dimensional measurement of a target object such as a trolley wire, a messenger wire, and a rail. The point-group data 11 refers to data expressed in terms of coordinate values of the points measured three-dimensionally by a measuring device using a laser scanner, a camera, a GPS antenna, and the like. The point-group data 11 is data on points measured three-dimensionally by the measuring device such as a Mobile Mapping System (MMS). However, the point-group data 11 is not limited thereto. FIG. 2 is a diagram illustrating an example of a three-dimensionally measured target object that is expressed by the point-group data 11 stored in the storage unit 10 according to the first embodiment. In FIG. 2, the scope of the three-dimensionally measured target object expressed by the point-group data 11 is defined as including rails 101 laid on the ground, a trolley wire 102 hanging in the air, a messenger wire 103 suspending the trolley wire 102, and the like. One point $P_i$ of a point group 104 of the three-dimensionally measured target object can be expressed as $P_i$ ($x_i$, $y_i$, $z_i$) by using three-axis coordinate values in the x-axis direction, the y-axis direction, and the z-axis direction. FIG. 3 is a diagram illustrating a configuration example of the point-group data 11 stored in the storage unit 10 according to the first embodiment. The storage unit 10 stores therein the point-group data 11 that is defined by the data on three-axis coordinate values of points $P_1$ to $P_K$ including the aforementioned point $P_i$ in the x-axis direction, the y-axis direction, and the z-axis direction. The x-axis direction, the y-axis direction, and the z-axis direction can be defined, for example, using a plane rectangular coordinate system such that the xy-axis is in the horizontal plane and the z-axis is oriented in the height direction. Alternatively, a coordinate system may be employed which has an origin at any point and defines, for example, the eastward direction as the x-axis direction, the northward direction as the y-axis direction, and the vertically upward direction as the z-axis direction. The unit indicating the data on the coordinate values of each point can be, but not limited to, meters (m) or the like.

The track measurement unit 20 includes a rail detection unit 21 and a reference setting unit 22.

Figure 4:
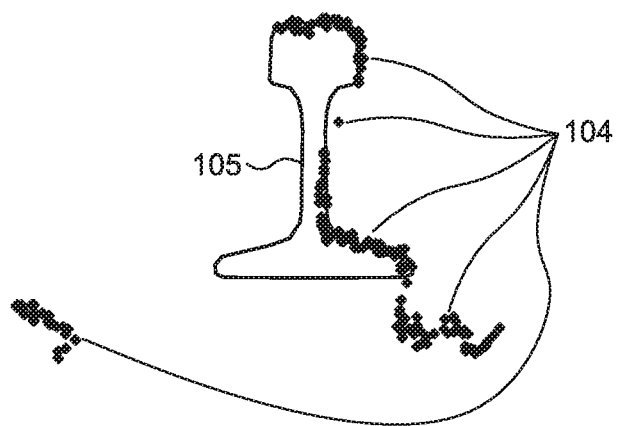
FIG. 4 is a conceptual diagram illustrating a process for detecting a rail in a rail detection unit according to the first embodiment.

The rail detection unit 21 detects the rail 101 from the point-group data 11 stored in the storage unit 10. For example, the rail detection unit 21 extracts from the point-group data 11 the point group 104 defined by a plurality of points, and then detects the rail 101 by performing matching between the shape expressed by the extracted point group 104 and a template 105 that is an aggregate of points taking the shape of the rail 101. FIG. 4 is a conceptual diagram illustrating a process of detecting the rail 101 in the rail detection unit 21 according to the first embodiment. As illustrated in FIG. 4, the rail detection unit 21 detects that there is the rail 101 at the position of the point group 104 that matches the shape of the template 105.

Figure 5:
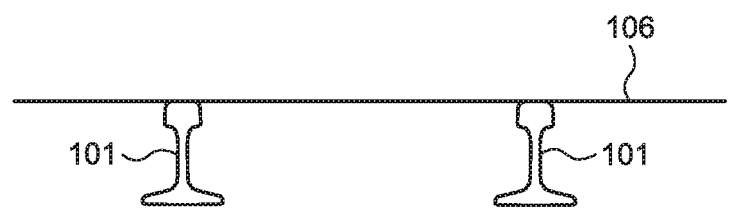
FIG. 5 is a conceptual diagram illustrating a process for deriving a rail plane in a reference setting unit according to the first embodiment.

On the basis of the rails 101 detected by the rail detection unit 21, the reference setting unit 22 sets a reference for measurement of the height and the displacement of the point on the trolley wire 102. Specifically, on the basis of the rails 101 detected by the rail detection unit 21, the reference setting unit 22 derives a rail plane which is a plane connecting respective top surfaces of the detected, two, left and right rails 101, that is, the reference setting unit 22 derives the rail plane that is a plane including the surfaces which a train contacts. FIG. 5 is a conceptual diagram illustrating a process of deriving a rail plane 106 in the reference setting unit 22 according to the first embodiment. As illustrated in FIG. 5, the reference setting unit 22 sets the rail plane 106 that is the plane connecting the respective top surfaces of the two, left and right rails 101. In practice, the reference setting unit 22 may compute to thereby derive the rail surface 106 from the point-group data 11 illustrated in FIG. 3 without drawing the rails 101 as illustrated in FIG. 5.

The reference setting unit 22 derives from the rail plane 106 a track center line positioned at the center between the two left and right side rails 101. FIG. 6 is a conceptual diagram illustrating a process of deriving a track center line 109 in the reference setting unit 22 according to the first embodiment. For example, the reference setting unit 22 sets rail points 107 at positions on the inner sides of the top portions of the two, left and right ones of the rails 101 detected by the rail detection unit 21. The reference setting unit 22 derives a rail line 108 connecting the rail points 107 of each of the left and right rails 101 by, for example, least squares approximation of the rail points 107. The reference setting unit 22 then derives the track center line 109 that is a line positioned at the center between the respective derived rail lines 108 of the left and right rails 101. The track center line 109 is equally distant from each of the rails 101. The positions of the rail points 107 are not limited to the inner sides of the top portions of the two, left and right rails 101, but may be the outer sides of the top portions of the two, left and right rails 101.

In FIG. 6, the rail points 107 indicate particular positions on the rail 101 detected by the rail detection unit 21. In this example, the rail points 107 indicate the positions on the inner sides of the top portions of the two left and right rails 101. The detection process in the rail detection unit 21 provides the coordinate values of the rail points 107 for the corrected location at which the rail 101 should be disposed relative to the live measured point-group data stored in the point-group data 11. FIG. 7 is a diagram illustrating an example of the data on the rail points 107 held in the rail detection unit 21 according to the first embodiment. The rail detection unit 21 holds therein the data on the rail points 107 illustrated in FIG. 7. The reference setting unit 22 uses the data on the rail points 107 illustrated in FIG. 7. As illustrated in FIGS. 6 and 7, the rail detection unit 21 detects the two rails 101 per track that are the left and right rails 101 in this example, and holds the data on rail points $107L_i$ of the left-side rail 101 and the data on rail points $107R_i$ of the right-side rail 101.

Figure 8:
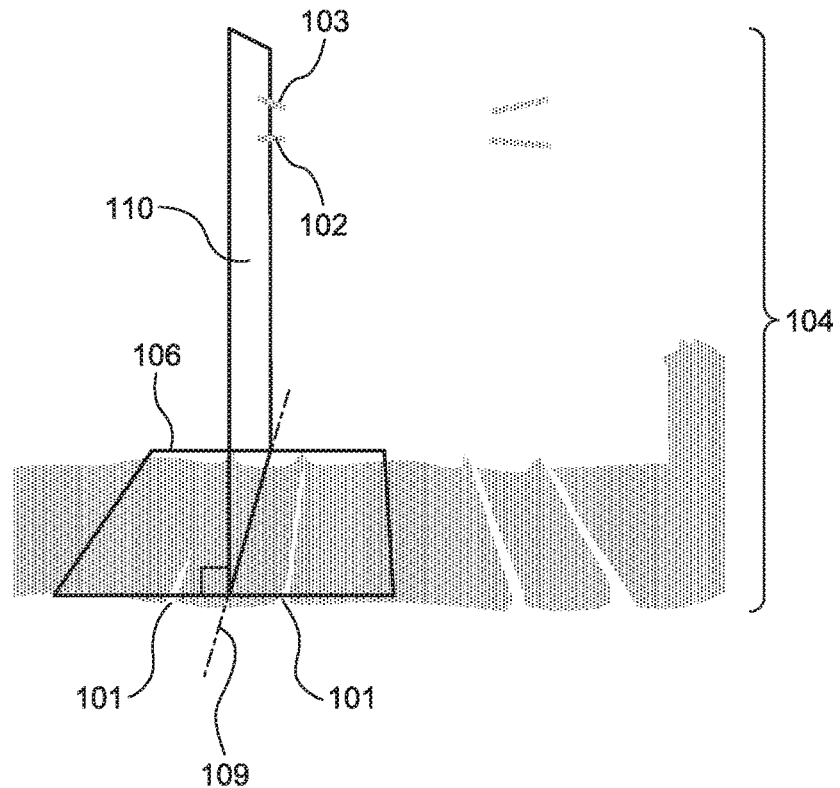
FIG. 8 is a diagram illustrating how a track center plane derived by the reference setting unit relates to a rail plane and the track center line according to the first embodiment.

Further, the reference setting unit 22 derives a track center plane orthogonal to the rail plane 106 on the track center line 109. FIG. 8 is a diagram illustrating how a track center plane 110 derived by the reference setting unit 22 relates to the rail plane 106 and the track center line 109 according to the first embodiment. In FIG. 8, the rail plane 106, the track center line 109, and the track center plane 110 are added to the illustrations in FIG. 2. The reference setting unit 22 outputs the derived rail plane 106 and the derived track center plane 110 as a first reference and a second reference, respectively, to the height and displacement measurement unit 40.

The trolley-wire detection unit 30 detects points on the trolley wire 102 from the point-group data 11 stored in the storage unit 10. The trolley-wire detection unit 30 is capable of performing a process of detecting points on the trolley wire 102 on all of the pieces of point-group data 11 stored in the storage unit 10. Unfortunately, such a detection process for all of the pieces of point-group data increases the processing amount for detecting the points on the trolley wire 102. It is thus desirable for the trolley-wire detection unit 30 to limit the area of the point group 104 that is to be extracted from the point-group data 11. For example, the trolley-wire detection unit 30 defines a specified range at a certain height or greater as an area of the point group 104 that is to be extracted. Alternatively, where the measurement of the trolley wire 102 has been previously performed, the lateral extraction area may be limited using information on the path of a vehicle having the measuring device mounted thereon at the time of the previous measurement, and information on the rail position.

Figure 9:
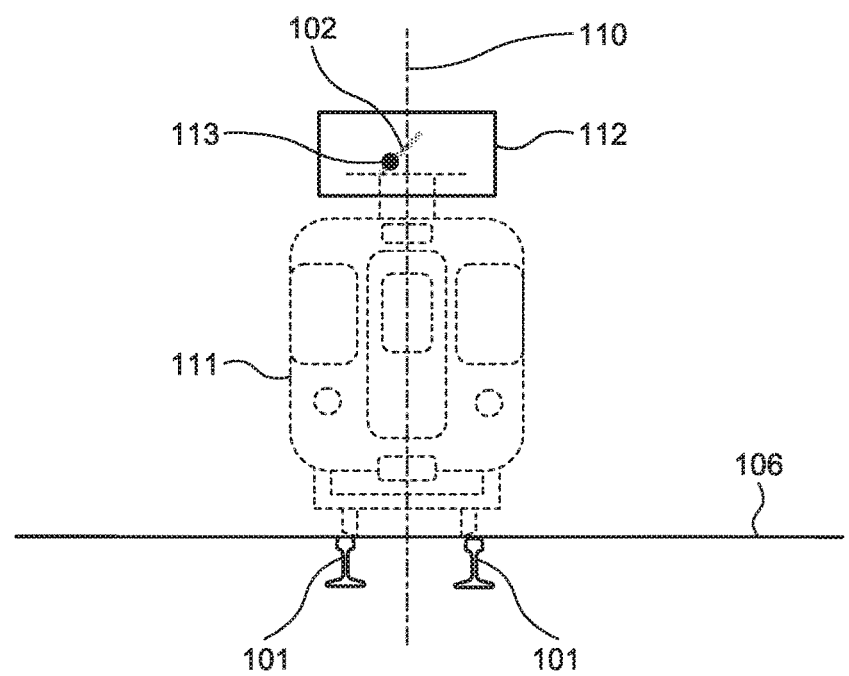
FIG. 9 is a diagram illustrating an example of an extraction area of point-group data to be extracted from the storage unit in a trolley-wire detection unit according to the first embodiment.

In general, the position of the trolley wire 102 is defined such that the height of the trolley wire from the rail plane 106 falls within a specified range, and that the displacement of the trolley wire, which is a distance from the track center plane 110, falls within a specified range. Although not illustrated in FIG. 1, thus, the trolley-wire detection unit 30 obtains information on the rail plane 106 and the track center plane 110 from the reference setting unit 22, and then limits the area of the point group 104 that is to be extracted from the point-group data 11, to a range slightly greater than the range of the height and displacement specified as the position of the trolley wire 102. FIG. 9 is a diagram illustrating an example of an extraction area of the point-group data 11 to be extracted from the storage unit 10 in the trolley-wire detection unit 30 according to the first embodiment. FIG. 9 illustrates a positional relation between an extraction area 112, and the rails 101, the trolley wire 102, the rail plane 106, the track center plane 110, a train 111, a point 113 on the trolley wire 102, and the like. The trolley-wire detection unit 30, which extracts from the storage unit 10 the point-group data 11 within the limited extraction area 112, can reduce the processing amount for detecting the point 113 on the trolley wire 102.

When a plurality of target objects is extracted from the area of the extracted point group 104 and the extracted target objects are arranged in the vertical direction, the trolley-wire detection unit 30 detects the lower one of the target objects as the point 113 on the trolley wire 102 because, in view of the overhead wire structure, the lower target object is regarded as the trolley wire 102 and the upper target object is regarded as the messenger wire 103 suspending the trolley wire 102. The trolley-wire detection unit 30 outputs the position of the detected point 113 on the trolley wire 102, that is, outputs information on the coordinate values of the point 113 on the trolley wire 102, to the height and displacement measurement unit 40. Furthermore, in a crossover or air section, it is expected that a plurality of trolley wires 102 exists in a horizontal direction in an extraction area 112. In a case where a plurality of target objects is extracted in the vertical direction in an area of the extracted point group 104 and a plurality combinations of target objects positioned in the vertical direction is extracted in the horizontal direction, the trolley-wire detection unit 30 detects a single trolley wire 102 from among the plurality combinations of target objects in the vertical direction and detects the target objects as different trolley wires 102 in the horizontal direction. That is, the trolley-wire detection unit 30 can detect the plurality of trolley wires 102 in the extraction area 112.

Figure 10:
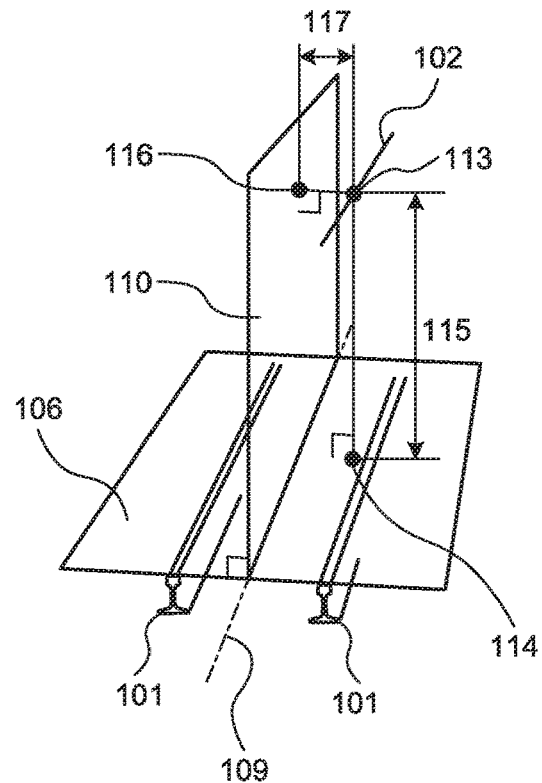
FIG. 10 is a diagram illustrating a height and a displacement of a point on a trolley wire which are measured by a height and displacement measurement unit according to the first embodiment.

The height and displacement measurement unit 40 uses the position of the point 113 on the trolley wire 102 obtained from the trolley-wire detection unit 30, the rail plane 106 that is a first reference, and the track center plane 110 that is a second reference obtained from the reference setting unit 22, thereby measuring the height of the point 113 on the trolley wire 102 from the rail plane 106, and the displacement of the point 113 on the trolley wire 102 from the track center plane 110. FIG. 10 is a diagram illustrating a height 115 and a displacement 117 of the point 113 on the trolley wire 102 which are measured by the height and displacement measurement unit 40 according to the first embodiment. The height and displacement measurement unit 40 defines the height 115 of the point 113 on the trolley wire 102 as a length from the point 113 on the trolley wire 102 to a foot 114 of the perpendicular extending to the rail plane 106. That is, the height and displacement measurement unit 40 defines the height 115 as a distance between the rail plane 106 and the point 113 on the trolley wire 102. Further, the height and displacement measurement unit 40 defines the displacement 117 of the point 113 on the trolley wire 102 as a length from the point 113 on the trolley wire 102 to a foot 116 of the perpendicular extending to the track center plane 110. That is, the height and displacement measurement unit 40 defines the displacement 117 as a distance between the track center plane 110 and the point 113 on the trolley wire 102.

Figure 11:
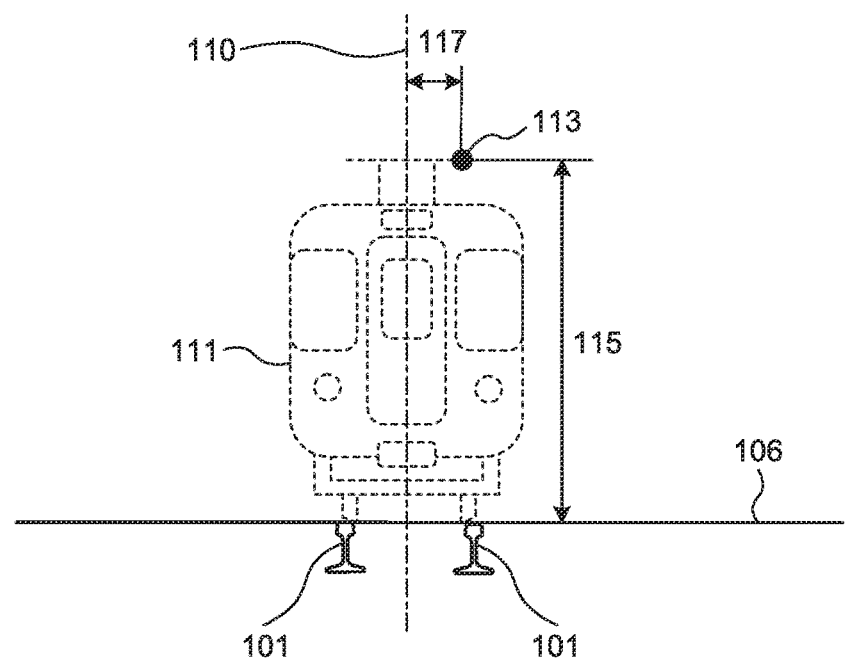
FIG. 11 is a diagram illustrating a positional relation between a train and a height and a displacement of a point on the trolley wire which have been measured by the height and displacement measurement unit according to the first embodiment.

FIG. 11 is a diagram illustrating a positional relation between the train 111 and the height 115 and the displacement 117 of the point 113 on the trolley wire 102 which have been measured by the height and displacement measurement unit 40 according to the first embodiment. By virtue of the height 115 and the displacement 117 of the point 113 on the trolley wire 102 which have been measured by the height and displacement measurement unit 40, personnel in charge of the railway facility maintenance can determine whether the position of the point 113 on the trolley wire 102 falls within a range specified by a railway company or the like, that is, whether the position of the point 113 on the trolley wire 102 agrees with the specified height and the specified displacement. FIG. 12 is a diagram illustrating data on the height 115 and the displacement 117 of a point $113T_i$ on the trolley wire 102 which have been measured by the height and displacement measurement unit 40 according to the first embodiment. The height and displacement measurement unit 40 additionally stores therein information on the measured height 115 and displacement 117 of the point $113T_i$ on the trolley wire 102 in association with the positional information on the point $113T_i$ on the trolley wire 102 obtained from the trolley-wire detection unit 30, that is, in association with the coordinate values of the point $113T_i$ on the trolley wire 102. As described above, in a case where the plurality trolley wires 102 has been detected in the extraction area 112, the height and displacement measurement unit 40 measures a height 115 and a displacement 117 of a point 113 on the trolley wire 102 for each of the plurality of trolley wires 102.

Figure 13:
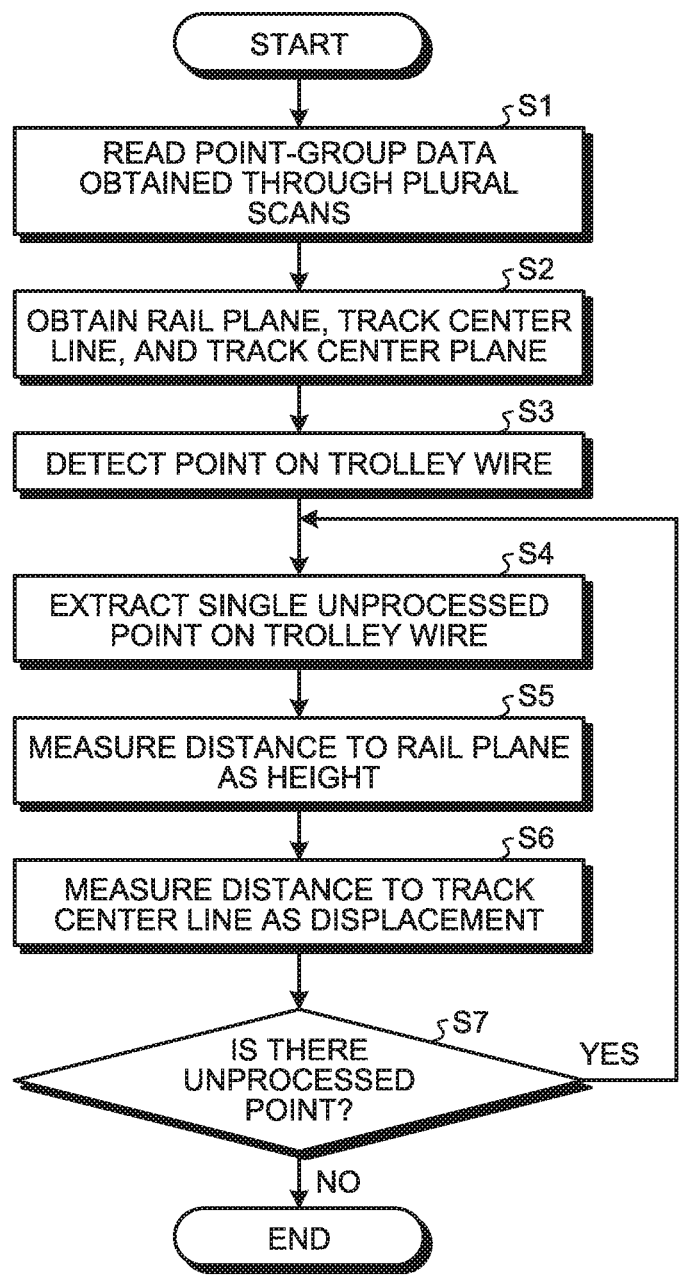
FIG. 13 is a flowchart illustrating a trolley-wire measuring process in the trolley-wire measurement device according to the first embodiment.

The trolley-wire measurement device 1 performs a process for measuring the point 113 on the trolley wire 102 as is described next with reference to a flowchart. FIG. 13 is a flowchart illustrating a trolley-wire measuring process in the trolley-wire measurement device 1 according to the first embodiment. In the trolley-wire measurement device 1, first, the track measurement unit 20 and the trolley-wire detection unit 30 read the point-group data 11 obtained through plural scans from the storage unit 10 (Step S1). In general, a measuring device, having generated the point-group data 11 on the basis of three-dimensional measurement, scans a target object as the measuring device is mounted on a vehicle moving on a track. The point-group data 11 obtained through the plural scans is, for example, data on a group of points with a dimension in the depth direction in three dimensions in FIG. 2 that is the traveling direction of a vehicle.

The track measurement unit 20 derives the rail plane 106, the track center line 109, and the track center plane 110 from the read point-group data 11 (Step S2).

Figure 14:
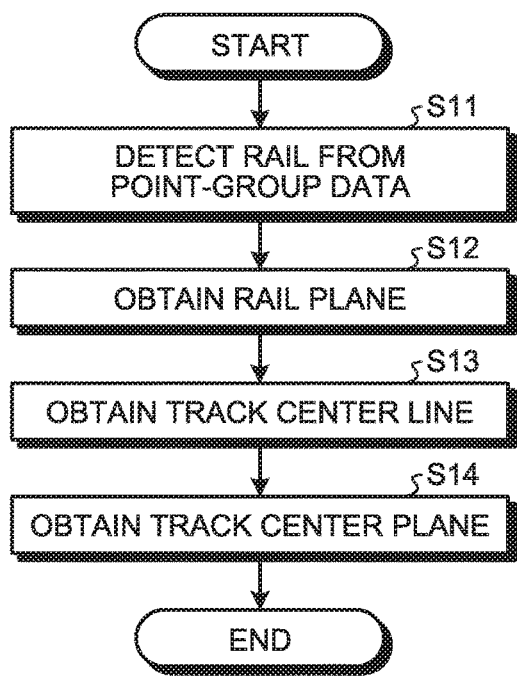
FIG. 14 is a flowchart illustrating a process in a track measurement unit according to the first embodiment.

FIG. 14 is a flowchart illustrating a process in the track measurement unit 20 according to the first embodiment. In the track measurement unit 20, first, the rail detection unit 21 detects the rails 101 from the read point-group data 11 (Step S11). Next, the reference setting unit 22 derives the rail plane 106 on the basis of the rails 101 detected by the rail detection unit 21 (Step S12). Then, the reference setting unit 22 derives the track center line 109 on the rail plane 106 (Step S13). Finally, the reference setting unit 22 derives the track center plane 110 which is located on the track center line 109 and orthogonal to the rail plane 106 (Step S14). The rail detection unit 21 detects the rails 101 through the process as discussed above. The reference setting unit 22 derives the rail plane 106, the track center line 109, and the track center plane 110 through the process as described above.

Referring back to the flowchart in FIG. 13, the trolley-wire detection unit 30 detects the point 113 on the trolley wire 102 from the read point-group data 11 (Step S3). The trolley-wire detection unit 30 detects the point 113 on the trolley wire 102 through the process as described above.

The height and displacement measurement unit 40 obtains the rail plane 106 and the track center plane 110 from the track measurement unit 20, and obtains the position of the point 113 on the trolley wire 102 from the trolley-wire detection unit 30. The height and displacement measurement unit 40 extracts one of unprocessed points 113 on the trolley wire 102 (Step S4).

The height and displacement measurement unit 40 measures the distance between the rail plane 106 and the point 113 on the trolley wire 102, as the height 115 of the point 113 on the trolley wire 102 (Step S5).

The height and displacement measurement unit 40 measures the distance between the track center plane 110 and the point 113 on the trolley wire 102, as the displacement 117 of the point 113 on the trolley wire 102 (Step S6).

When an unprocessed point 113 on the trolley wire 102 having the height 115 and displacement 117 not yet derived exists (YES at Step S7), the process returns to Step S4 such that the height and displacement measurement unit 40 repeatedly executes the processes from Steps S4 to S6.

When an unprocessed point 113 on the trolley wire 102 having height 115 and displacement 117 not yet derived does not exist (NO at Step S7), the height and displacement measurement unit 40 ends the measuring process.

Figure 15:
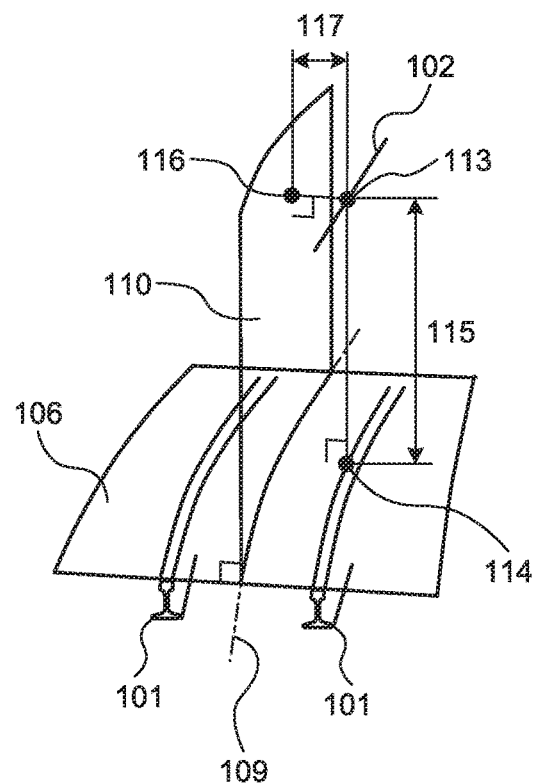
FIG. 15 is a diagram illustrating a height and a displacement of a point on the trolley wire which are measured by the height and displacement measurement unit according to the first embodiment in a case where rails are curved.

Although the present embodiment has been described by way of example with reference to the rails 101 that are straight as illustrated in FIG. 10 and other diagrams, the present invention is also applicable to the rails 101 that are curved. FIG. 15 is a diagram illustrating the height 115 and the displacement 117 of the point 113 on the trolley wire 102 which are measured by the height and displacement measurement unit 40 according to the first embodiment in a case where the rails 101 are curved. Even in the case where the rails 101 are curved, the height and displacement measurement unit 40 can still measure a distance from the point 113 on the trolley wire 102 to the rail plane 106, as the height 115 of the point 113 on the trolley wire 102, and measure a distance from the point 113 on the trolley wire 102 to the track center plane 110, as the displacement 117 of the point 113 on the trolley wire 102. The same applies to other embodiments to be described later.

Figure 16:
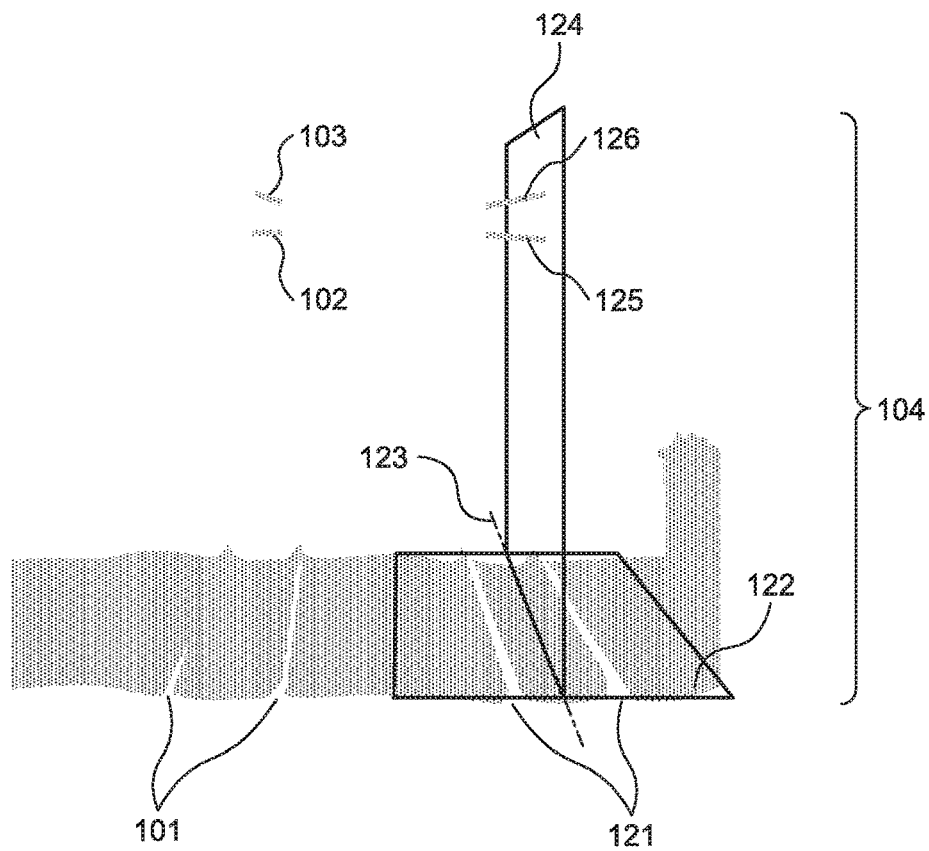
FIG. 16 is a diagram illustrating a rail plane, a track center line, and a track center plane of a parallel track, which are derived by the reference setting unit according to the first embodiment.

The trolley-wire measurement device 1 as discussed above measures the height 115 and the displacement 117 of the point 113 on the trolley wire 102 for one track. When there is another track running in parallel to the one track, the trolley-wire measurement device 1 is also capable of measuring the height and the displacement of a point on a trolley wire for the rails of the parallel track. When the point-group data 11 stored in the storage unit 10 includes point-group data regarding a plurality of tracks, as illustrated in FIG. 8, the trolley-wire measurement device 1 is also capable of deriving rails, a rail plane, a track center line, and a track center plane for the right track running in parallel to the left track as illustrated in FIG. 8, as with the left track, thereby measuring the height and the displacement of a point on a trolley wire for the parallel track. FIG. 16 is a diagram illustrating a rail plane 122, a track center line 123, and a track center plane 124 for the parallel track, which are derived by the reference setting unit 22 according to the first embodiment. FIG. 16 illustrates a positional relation between rails 121, the rail plane 122, the track center line 123, the track center plane 124, a trolley wire 125, and a messenger wire 126 for the parallel track. For example, in FIG. 8 and FIG. 16, when a measuring device having generated the point-group data 11 through three-dimensional measurement is mounted on a vehicle running on the left track, the trolley-wire measurement device 1 is also capable of deriving the rail plane 122, the track center line 123, and the track center plane 124 on the basis of the rails 121 for the right, parallel track running in parallel to the left track, thereby measuring the height and the displacement of a point on the trolley wire 125.

Further, at a crossover section where a plurality of tracks branch off or join together, the trolley-wire measurement device 1 is also capable of deriving rails, a rail plane, a track center line, and a track center plane for each of the main and side tracks, thereby measuring the height and the displacement of a point on a trolley wire on the basis of the rails of each of the main and side tracks.

When the point-group data 11 includes points regarding a plurality of tracks, the rail detection unit 21 detects rails on a track-by-track basis. The reference setting unit 22 derives a rail plane, a track center line, and a track center plane on a track-by-track basis, and outputs the first reference and the second reference for each track, to the height and displacement measurement unit 40. The trolley-wire detection unit 30 detects a point on a trolley wire on a track-by-track basis. The height and displacement measurement unit 40 measures the height and the displacement of the point on the trolley wire on a track-by-track basis.

Although the trolley-wire measurement device 1 discussed above obtains the entire image of the trolley wire 102, and measures the height 115 and the displacement 117 of the point 113 on the trolley wire 102, the trolley-wire measurement device 1 is not limited to this approach. For example, the trolley-wire measurement device 1 may approximate a combination of straight lines from the point group 104 to provide the trolley wire 102, thereby measuring the height 115 and the displacement 117 of the point 113 that is the vertex point of the trolley wire 102 resulting from the approximation. Such an approach enables the trolley-wire measurement device 1 to measure the height 115 and the displacement 117 of the point 113 on the trolley wire 102, as with the case of obtaining the entire image of the trolley wire 102 to measure the height 115 and the displacement 117 of the point 113 on the trolley wire 102. For the trolley-wire measurement device 1, the volume of the point-group data 11 to be used can be reduced to thereby reduce the amount processed in measuring the height 115 and the displacement 117 of the point 113 on the trolley wire 102. As a result, the capacity of the storage unit 10 that stores therein the point-group data 11 can be small.

Next, a configuration of the trolley-wire display device 5 will be described. The trolley-wire display device 5 includes a display reference point setting unit 51, a distance measurement unit 52, a display control unit 53, and a display unit 54.

Figure 17:
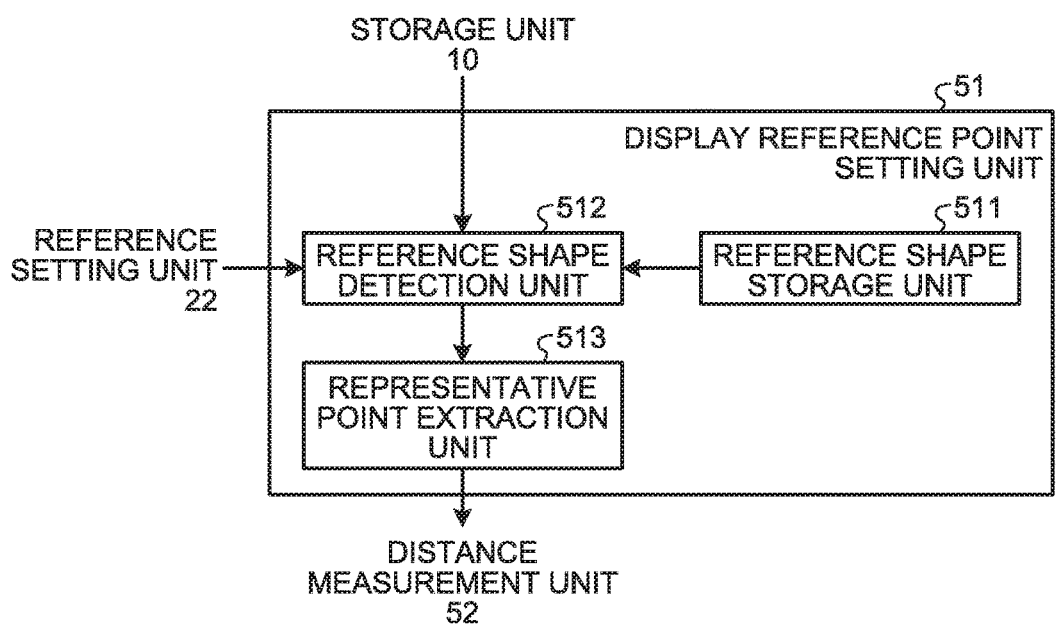
FIG. 17 is a block diagram illustrating a configuration example of a display reference point setting unit according to the first embodiment.

The display reference point setting unit 51 sets a display reference point of the point-group data 11 for a point 113 on the trolley wire 102, the point 113 having its height 115 and displacement 117 measured on the basis of a reference obtained from the rails 101 that define the track on which the train 111 runs. The display reference point serves as a positional reference used when each point is displayed. Specifically, using the point-group data 11 used when the height 115 and displacement 117 of the trolley wire 102 were measured by the trolley-wire measurement device 1, the display reference point setting unit 51 sets the display reference point that serves as a reference of an operational distance when the height 115 and displacement 117 of the trolley wire 102 are displayed. FIG. 17 is a block diagram of a configuration example of the display reference point setting unit 51 according to the first embodiment. The display reference point setting unit 51 includes a reference shape storage unit 511, a reference shape detection unit 512, and a representative point extraction unit 513.

The reference shape storage unit 511 is a storage unit which stores information on a reference shape model that is information on a three-dimensional shape of a railway structure used to set the display reference point. The railway structure is a facility used to operate the train 111 and is a structure installed on the ground by a user that is a railway company. The railway structure includes, for example, kilo markers, stations, railway crossings, bridges, and tunnels. The railway structure as described hereinbelow is, by way of example, a kilo marker installed on a lateral side of the rail 101. The kilo marker, which is often called "kilo-post", is a sign that indicates, in kilometers, a distance from a start point of a train line. In this case, the reference shape model is expressed as a three-dimensional shape of the kilo marker.

Figure 18:
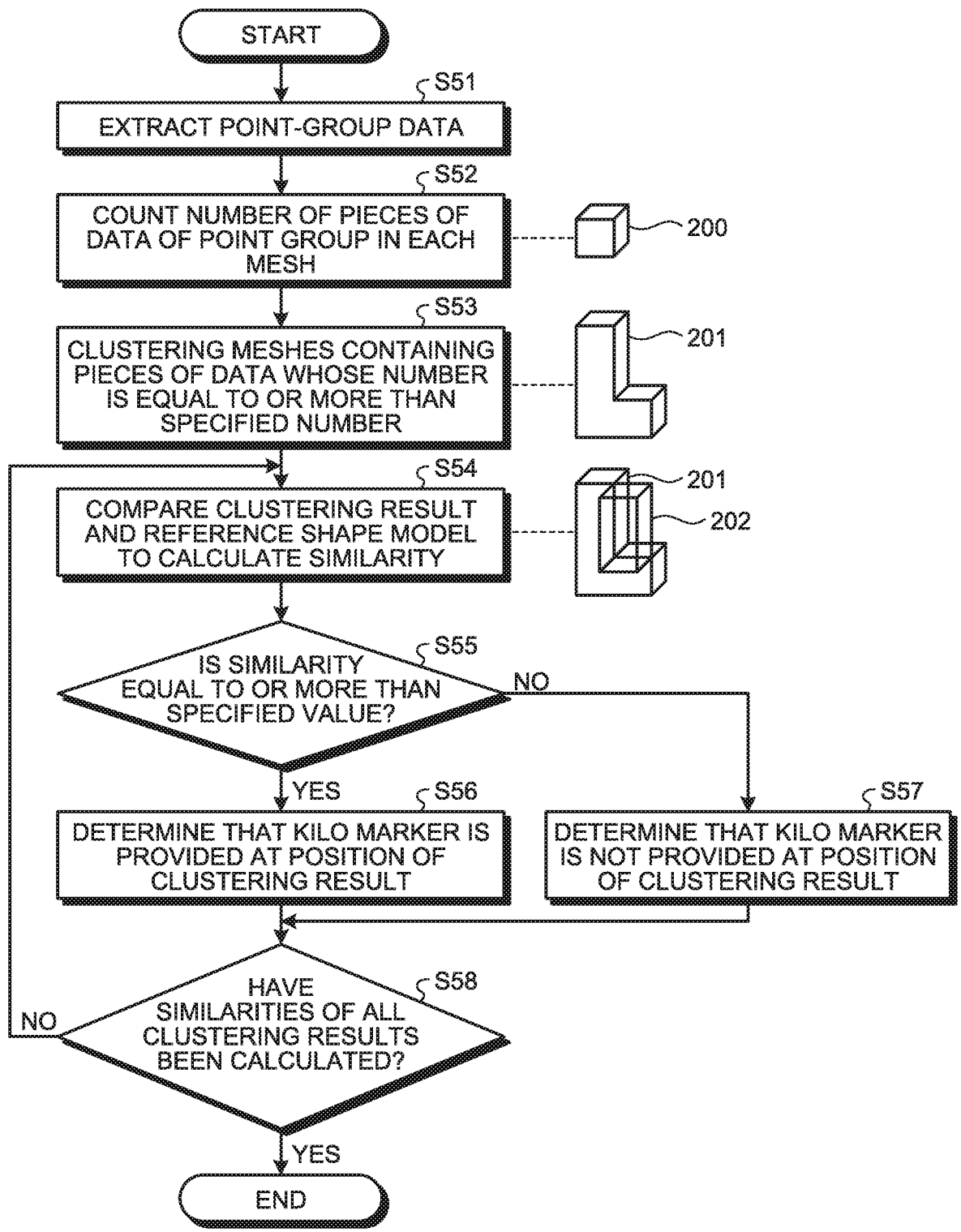
FIG. 18 is a flowchart illustrating a process for detecting a kilo marker which is a reference shape from point-group data by a reference shape detection unit according to the first embodiment.

The reference shape detection unit 512 extracts the point-group data 11 from the storage unit 10 of the trolley-wire measurement device 1 and detects the reference shape model from the extracted point-group data 11. The reference shape model, which is the shape of the kilo marker, is stored in the reference shape storage unit 511. FIG. 18 is a flowchart illustrating a process of detecting the kilo marker which is a reference shape from the point-group data 11 by the reference shape detection unit 512 according to the first embodiment.

Figure 19:
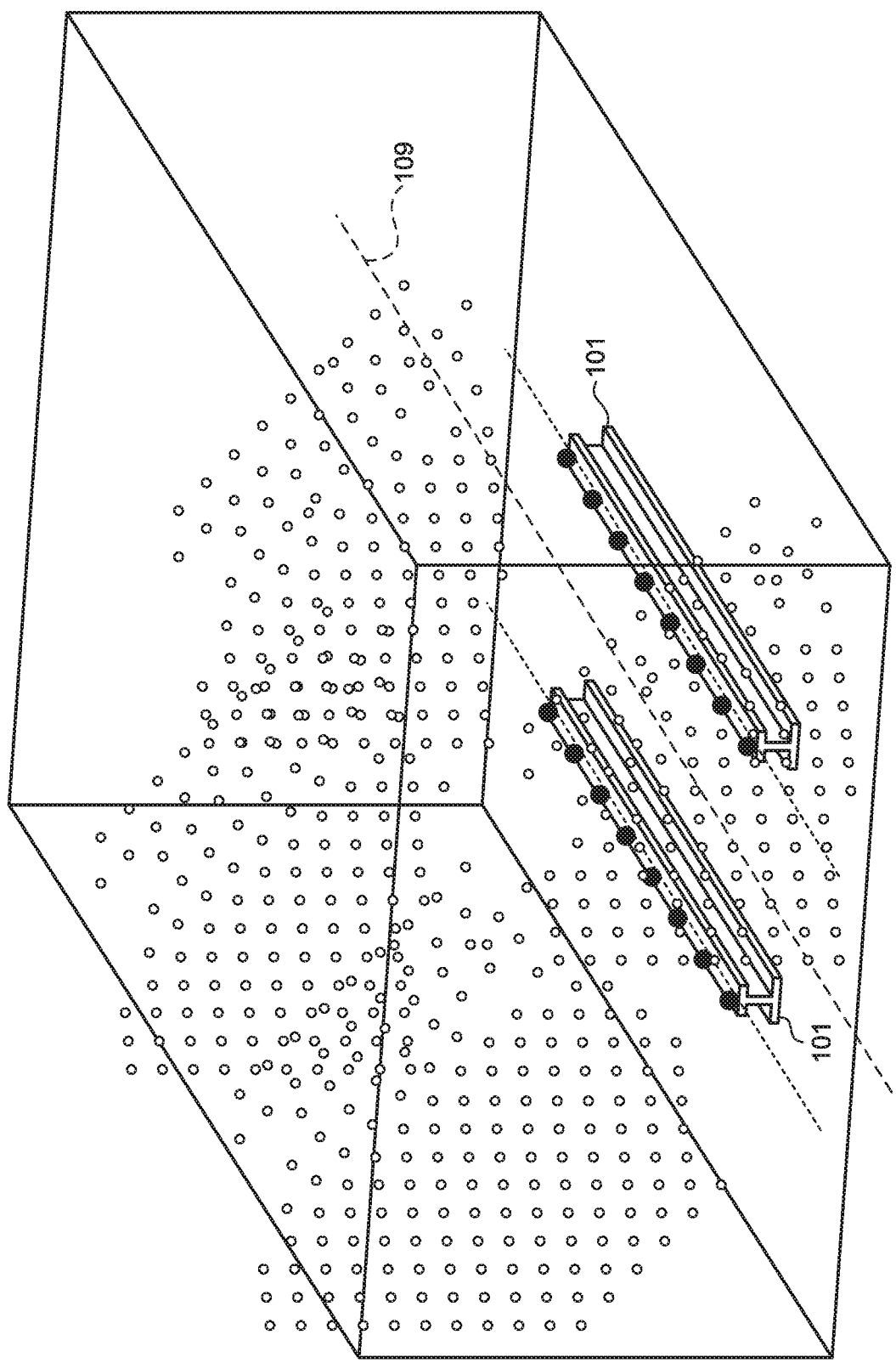
FIG. 19 is a conceptual diagram illustrating a range of extraction of the point-group data from the storage unit of the trolley-wire measurement device by the reference shape detection unit according to the first embodiment.

The reference shape detection unit 512 obtains positional information on the track center line 109 from the reference setting unit 22 of the trolley-wire measurement device 1 and extracts, from the storage unit 10 of the trolley-wire measurement device 1, the point-group data 11 around the track center line 109 (Step S51). FIG. 19 is a conceptual diagram illustrating a range of extraction of the point-group data 11 from the storage unit 10 of the trolley-wire measurement device 1 by the reference shape detection unit 512 according to the first embodiment. Although not illustrated in FIG. 19, the diagram is illustrated as imaging the point group 104 by individual white circles illustrated in FIG. 19. The actual point group 104 is much smaller as illustrated in, for example, FIGS. 2 and 4.

The reference shape detection unit 512 divides the range illustrated in FIG. 19 into meshes 200 having a certain size and counts the number of pieces of data of the point group 104 contained in each mesh 200 (Step S52). The assumption is that the mesh 200 having a certain size is smaller than the reference shape of the kilo marker that is the reference shape model. An image of the mesh 200 having a certain size is illustrated next to a box denoted by S52 in the flowchart in FIG. 18.

The reference shape detection unit 512 extracts the meshes 200 each containing pieces of data whose number is equal to or more than a specified number, and performs clustering on these extracted meshes (Step S53). That is, the reference shape detection unit 512 groups a cluster of the extracted meshes 200. It is expected that there is high possibility that the actual structure is located at a position of the mesh 200 containing pieces of data whose number is equal to or more than the specified number. Illustrated next to S53 of the flowchart in FIG. 18 is an image of a clustering result 201 defined by a result of the clustering of the meshes 200 containing pieces of data whose number is equal to or more than the specified number.

The reference shape detection unit 512 compares the clustering result 201 with a reference shape model 202 and calculates the similarity between the clustering result 201 and the reference shape model 202 (Step S54). Illustrated next to S54 of the flowchart in FIG. 18 is an image of comparison between the clustering result 201 and the reference shape model 202.

Figure 20:
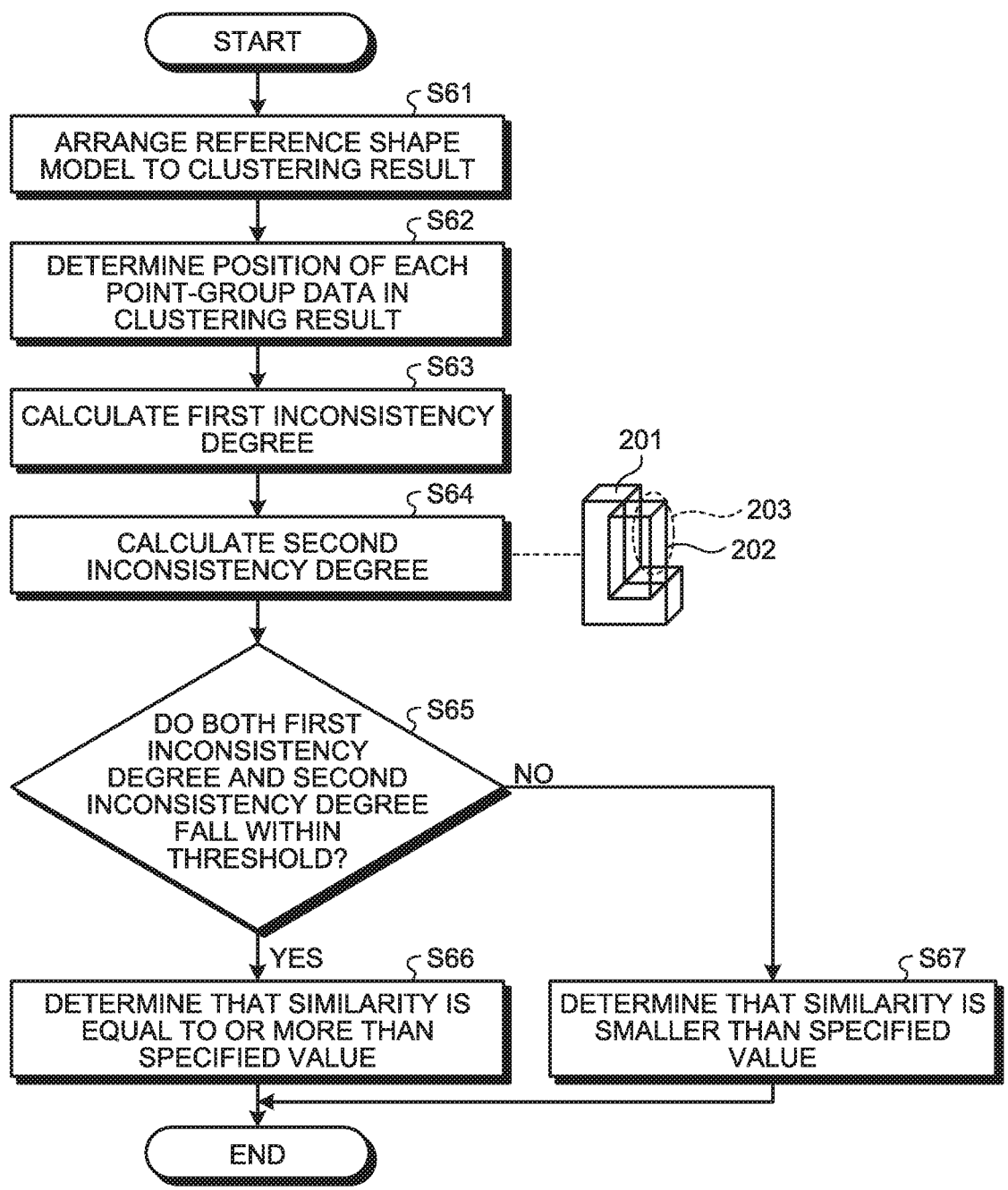
FIG. 20 is a flowchart illustrating a process for determining a similarity between a clustering result and a reference shape model in the reference shape detection unit according to the first embodiment.

Here, a process performed by the reference shape detection unit 512 for calculating and determining the similarity between the clustering result 201 and the reference shape model 202 will be described in detail. FIG. 20 is a flowchart illustrating a process for determining the similarity between the clustering result 201 and the reference shape model 202 in the reference shape detection unit 512 according to the first embodiment.

The reference shape detection unit 512 positions the reference shape model 202 so that the reference shape model 202 most exactly overlaps the clustering result 201 that is a target for determination (Step S61).

The reference shape detection unit 512 determines the position of the data on each point group 104, that is, whether the data on each point group 104 contained in the clustering result 201 that is a target for determination is located inside or outside the reference shape model 202 (Step S62).

The data on each point group 104 contained in the clustering result 201 that is the target for determination includes the data on each point group 104 located outside the reference shape model 202. The reference shape detection unit 512 obtains the shortest distance from the reference shape model 202 to the data on each point group 104 located outside the reference shape model 202, and counts the number of pieces of data on the point group 104 having the shortest distance that is equal to or longer than the specified value. In a case where the number of pieces of data on the point group 104 having the shortest distance equal to or longer than the specified value is equal to or more than a threshold, the reference shape detection unit 512 calculates a first inconsistency degree (Step S63). The first inconsistency is an exceeding amount defined by a total of the distances of pieces of the data on individual point groups 104 to the reference shape model 202.

With the reference shape model 202 most exactly overlapping the clustering result 201 that is the target for determination, the reference shape detection unit 512 calculates a second inconsistency degree (Step S64). The second inconsistency is a magnitude of the shortage obtained from a ratio of a spatial volume of the reference shape model 202 which does not occupy the clustering result 201 that is the target for determination. Illustrated next to S64 in FIG. 20 is the clustering result 201 and the reference shape model 202 that overlap. A part indicated by a dotted line 203 is a spatial volume of the reference shape model 202 which is not filled with the volume of the clustering result 201 that is the target for determination.

In a case where both of the calculated first inconsistency degree and second inconsistency degree fall within a threshold used to determine the similarity (YES at Step S65), the reference shape detection unit 512 determines that the similarity is equal to or more than a specified value (Step S66). In a case where one or both of the calculated first inconsistency degree and the calculated second inconsistency degree is larger than the threshold (NO at Step S65), the reference shape detection unit 512 determines that the similarity is smaller than the specified value (Step S67).

Reference is made back to the flowchart in FIG. 18. In a case where the similarity is equal to or more than the specified value (YES at Step S55), the reference shape detection unit 512 sets the compared clustering result 201 as the reference shape. That is, the reference shape detection unit 512 determines that the kilo marker is located at the position of the compared clustering result 201 (Step S56). In a case where the similarity is less than the specified value (NO at Step S55), the reference shape detection unit 512 determines that the kilo marker is not located at the place of the compared clustering result 201 (Step S57). In a case where there is a plurality of clustering results 201 among which there is a clustering result 201 whose similarity is not calculated (NO at Step S58), the reference shape detection unit 512 returns to Step S54 and repeats the similar process. In a case where the similarities of all the clustering results 201 have been calculated (YES at Step S58), the reference shape detection unit 512 terminates the process.

Figure 21:
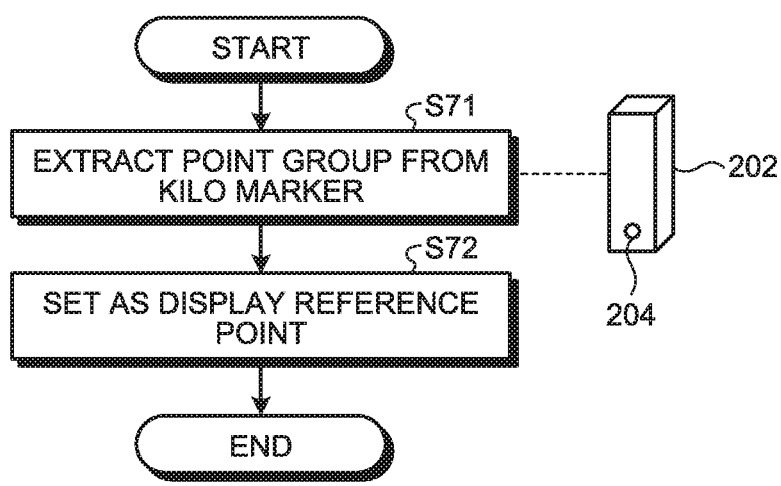
FIG. 21 is a flowchart illustrating a process performed by a representative point extraction unit according to the first embodiment for setting a display reference point.

FIG. 21 is a flowchart illustrating a process performed by the representative point extraction unit 513 according to the first embodiment for setting the display reference point. The representative point extraction unit 513 extracts an arbitrary single point group 104 from the reference shape model 202, i.e., the kilo marker detected by the reference shape detection unit 512 (Step S71). The representative point extraction unit 513 sets the position of the extracted point group 104 as a display reference point 204 (Step S72). Illustrated next to S71 in FIG. 21 is an image of a relation between the reference shape model 202 and the display reference point 204.

In a case where a range of display of the point 113 on the trolley wire 102 is determined with regard to which kilo marker each display reference point 204 corresponds to, that is, what kilometer is indicated by each display reference point 204, the user registers, in the display reference point setting unit 51 in advance, information on the number of kilometers within the displayed range and on the distance indicated by each kilometer. As a result, the display reference point setting unit 51 can associate the display reference point 204 with kilometers indicated by the kilo marker. A user may, later, set information on the kilometers for the set display reference point 204, and the setting method is not limited to these.

Figure 22:
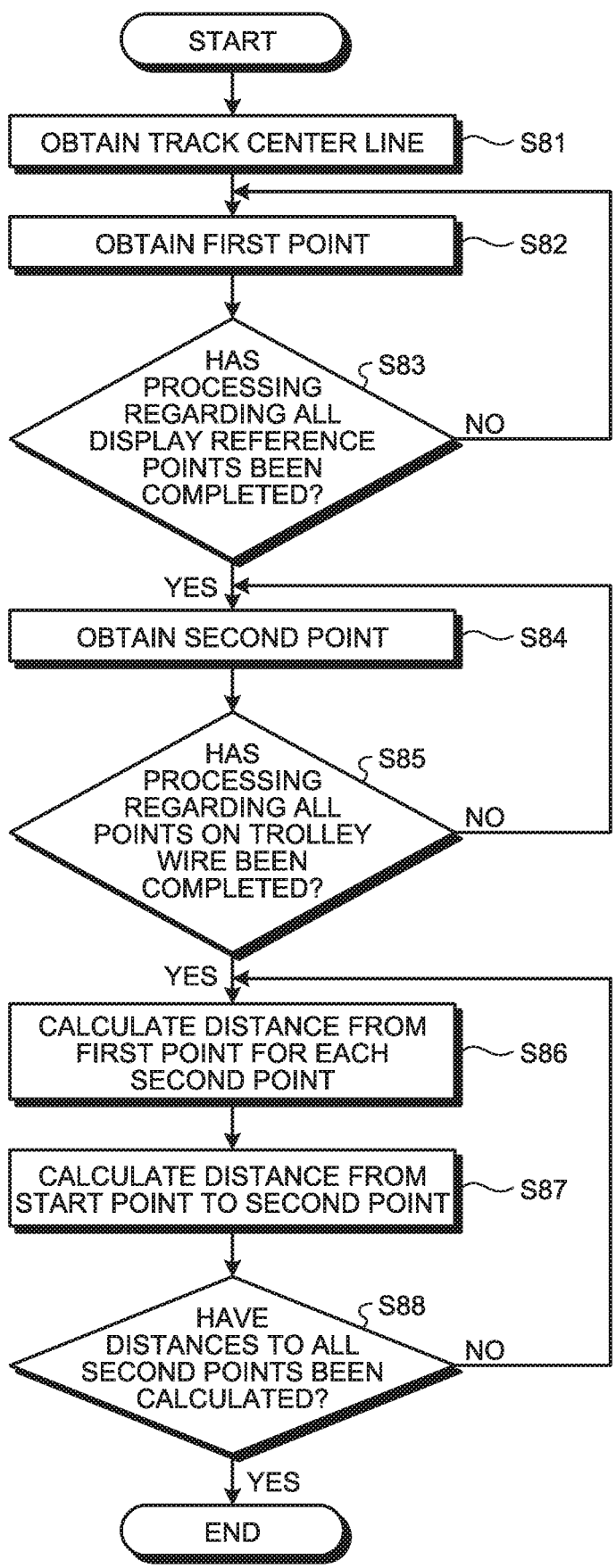
FIG. 22 is a flowchart illustrating a process performed by a distance measurement unit according to the first embodiment for measuring a distance from a point on the track center line to another point on the track center line, the former point corresponding to the display reference point, the latter point corresponding to a point on the trolley wire.
Figure 23:
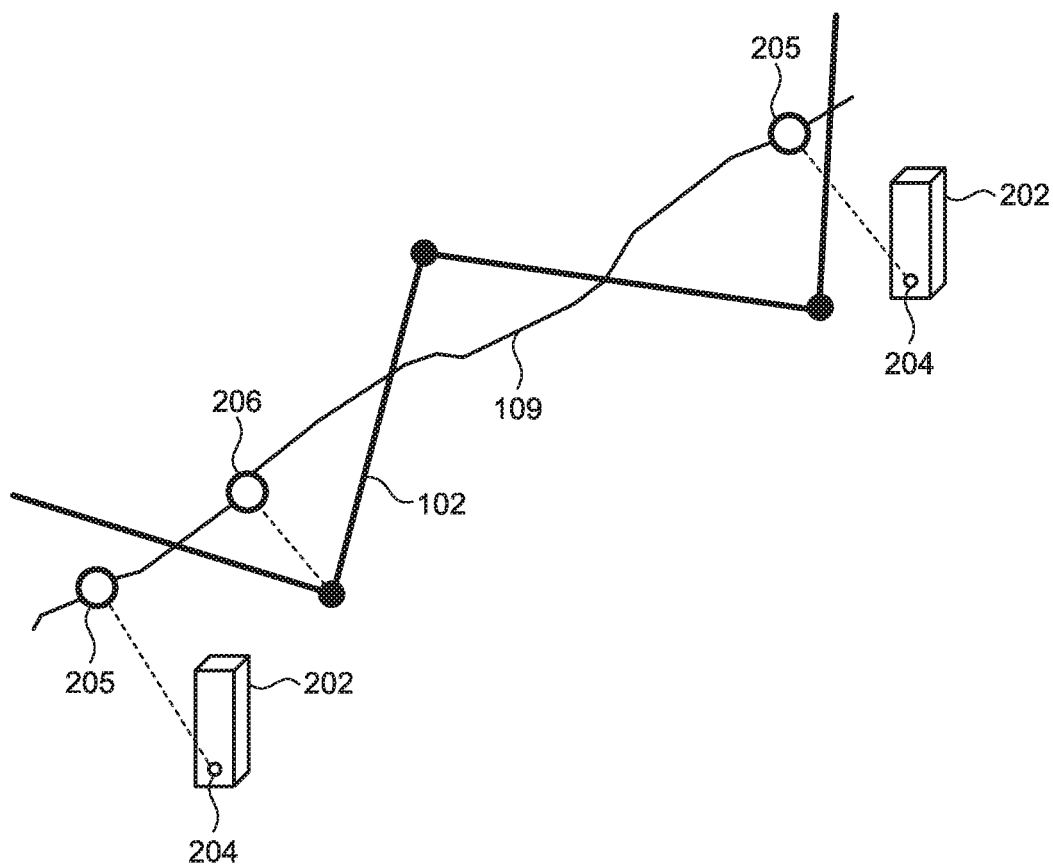
FIG. 23 is a diagram illustrating an example of a positional relation between a first point and a second point to be targets defining a distance therebetween, the distance being obtained in the distance measurement unit according to the first embodiment.

The distance measurement unit 52 measures a distance between a point on the track center line 109 and another point on the track center line 109. The former point corresponds to the display reference point 204. The latter point corresponds to the point 113 on the trolley wire 102, the point 113 having the height 115 and the displacement 117 measured by the height and displacement measurement unit 40 of the trolley-wire measurement device 1. FIG. 22 is a flowchart illustrating a process performed by the distance measurement unit 52 according to the first embodiment for measuring the distance from the point on the track center line 109 to the other point on the track center line 109, the former point corresponding to the display reference point 204, the latter point corresponding to the point 113 on the trolley wire 102. FIG. 23 is a diagram illustrating an example of a positional relation between a first point 205 and a second point 206 to be targets defining a distance therebetween, the distance being obtained in the distance measurement unit 52 according to the first embodiment.

The distance measurement unit 52 obtains positional information on the track center line 109 from the reference setting unit 22 of the trolley-wire measurement device 1 and obtains the track center line 109 (Step S81). The distance measurement unit 52 may use all the points obtained from the reference setting unit 22, and set the track center line 109 defined as a line connecting the points to one another. Alternatively, the distance measurement unit 52 may group the points at certain intervals and set the track center line 109 defined as a line obtained by linearly approximating the points of the individual groups by, for example, least squares approximation.

The distance measurement unit 52 extracts a single display reference point 204 set by the display reference point setting unit 51 and obtains the position of the first point 205 on the track center line 109, the first point 205 being located the shortest distance from the display reference point 204 (Step S82). In a case where the process for obtaining the positions of the first points 205 for all the display reference points 204 has not been completed (NO at Step S83), the distance measurement unit 52 returns to Step S82 to extract a single unprocessed display reference point 204 and repeats the similar process.

In a case where the process for obtaining the first points 205 for all the display reference points 204 has been terminated (YES at Step S83), the distance measurement unit 52 extracts a single point 113 on the trolley wire 102, the extracted single point 113 having the height 115 and displacement 117 measured by the height and displacement measurement unit 40 of the trolley-wire measurement device 1. The distance measurement unit 52 then obtains the position of the second point 206 on the track center line 109, the second point 206 being located the shortest distance from the point 113 on the trolley wire 102 (Step S84). In a case where the process for obtaining the positions of the second points 206 for all the points 113 on the trolley wire 102 has not been terminated (NO at Step S85), the distance measurement unit 52 returns to Step S84 to extract the single unprocessed point 113 on the trolley wire 102 and repeats the similar process.

In a case where the process of obtaining the second point 206 for all the points 113 on the trolley wire 102 has been completed (YES at Step S85), the distance measurement unit 52 calculates a first distance, i.e., a distance from the first point 205 to each second point 206 (Step S86). In a case where there is the plurality of display reference points 204, and thus there is the plurality of first points 205 on the track center line 109, the distance measurement unit 52 may calculate a distance from, for example, the closest first point 205 to the second point 206. Alternatively, the distance measurement unit 52 may calculate a distance from the first point 205 to the second point 206, the first point 205 being closer to a start point used when the distance is displayed.

For example, in FIG. 23, the two first points 205 are located on the track center line 109. Of these two first points 205, the first point 205 located on the lower side is closer to the second point 206 corresponding to the point 113 on the trolley wire 102 than the other first point 205 is. The distance measurement unit 52 calculates a distance from this lower first point 205 to the second point 206.

Figure 24:
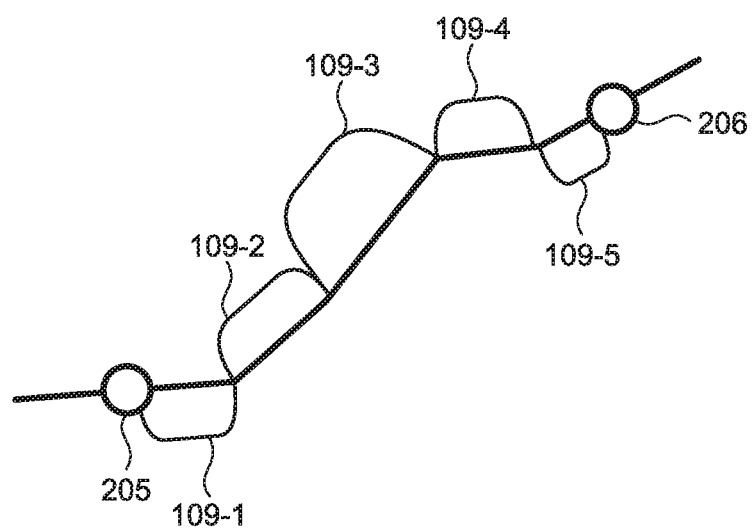
FIG. 24 is a diagram illustrating an example of a distance on the track center line when the distance between the first point and the second point is obtained in the distance measurement unit according to the first embodiment.

In a case where the distance measurement unit 52 calculates the distance from the closest first point 205 to the second point 206, the distance to be calculated is not the shortest distance from the first point 205 to the second point 206, but is a distance on the track center line 109 from the first point 205 to the second point 206. FIG. 24 is a diagram illustrating an example of a distance on the track center line 109 when the distance between the first point 205 and the second point 206 is obtained in the distance measurement unit 52 according to the first embodiment. In a case where the track center line 109 is actually made up of a plurality of line segments, the distance measurement unit 52 defines the first distance, i.e., the distance from the first point 205 to the second point 206 as a distance obtained by totaling the lengths of line segments 109-1 to 109-5 illustrated in FIG. 24 on the track center line 109 from the first point 205 to the second point 206.

The distance measurement unit 52 adds the calculated distance from the first point 205 to the second point 206, to a second distance that is a distance to the first point 205 from a positional start point used when the point 113 on the trolley wire 102 is displayed. That is, the distance measurement unit 52 calculates a third distance that is the distance from the start point to the second point 206 (Step S87). The second distance is the distance to the first point 205 from the positional start point used when the point 113 on the trolley wire 102 is displayed.

In a case where the distances from the start point for all the second points 206 has not been calculated (NO at Step S88), the distance measurement unit 52 returns to Step S86 and repeats the similar process. In a case where the distances from the start point for all the second points 206 has been calculated (YES at Step S88), the distance measurement unit 52 terminates the process.

The display control unit 53 creates display data to be displayed on the display unit 54 wherein a horizontal axis represents the positional relation of the points 113 on the trolley wire 102 along the track center line 109, that is, the horizontal axis represents the third distance, and a vertical axis represents each of the height 115 and displacement 117 of the point 113 on the trolley wire 102 corresponding to the second point 206. The third distance, which is obtained by the distance measurement unit 52 on the track center line 109, is the distance from the start point to the second point 206. FIG. 25 is a diagram illustrating an example of a display screen provided by the trolley-wire display device 5 according to the first embodiment for displaying the height 115 and displacement 117 of the point 113 on the trolley wire 102. The display control unit 53 creates the display data of the display screen illustrated in FIG. 25 to be displayed on the display unit 54 and performs a control for displaying the created display data on the display unit 54. In FIG. 25, in the diagram of the displacement 117, the position of the track center line 109 in the horizontal direction is set as a reference, that is, "zero". Furthermore, in FIG. 25, in the diagram of the height 115, the position of the track center line 109 in the vertical direction is set as a reference, that is, "zero" which is not illustrated. The units of numerals indicated by the horizontal axis and the vertical axis are meters (m), and the same applies to examples of the display screen illustrated in the diagrams as described hereinafter. The display control unit 53 creates and displays the display data on the display unit 54 so that displays of variations in the height 115 and the displacement 117 are provided in alignment as illustrated in FIG. 25. As a result, a user who has viewed the display on the display unit 54 can easily recognize the variations in the height 115 and displacement 117 of the point 113 on the trolley wire 102. Furthermore, the user can easily recognize the positional relation of the trolley wires 102 in a section such as an air section where the plurality of trolley wires 102 is provided as illustrated in FIG. 25.

In the example in FIG. 25, the height 115 and the displacement 117 of the point 113 on the trolley wire 102 relative to the track center line 109 are displayed. Alternatively, the height 115 and the displacement 117 can be displayed on the basis of actual three-dimensional data. FIG. 26 is a diagram illustrating another example of a display screen provided by the trolley-wire display device 5 according to the first embodiment for displaying the height 115 and the displacement 117 of the point 113 on the trolley wire 102. In FIG. 26, the display control unit 53 performs control for creating and displaying display data on the display unit 54. As a result, the track center line 109 as well as the height 115 and displacement 117 of the point 113 on the trolley wire 102 obtained by three-dimensional measurement are displayed on the display unit 54 in three-dimensional coordinates. Thus, the user who has viewed the display on the display unit 54 can easily recognize actual positional relation between the track center line 109 and the trolley wire 102.

The display unit 54 performs display on the basis of the display data of the display screen illustrated in, for example, FIGS. 25 and 26, and created by the display control unit 53. The display unit 54 may be provided outside the trolley-wire display device 5 rather than within the trolley-wire display device 5. Furthermore, the trolley-wire display device 5 may display on the display unit 54 the display data of the display screen created by the display control unit 53 and output from an output unit (not illustrated) the display data by printing the data on paper or output the display data to a storage medium. In addition, the trolley-wire display device 5 may transmit the display data to other devices by using a communication device which is not illustrated.

Figure 27:
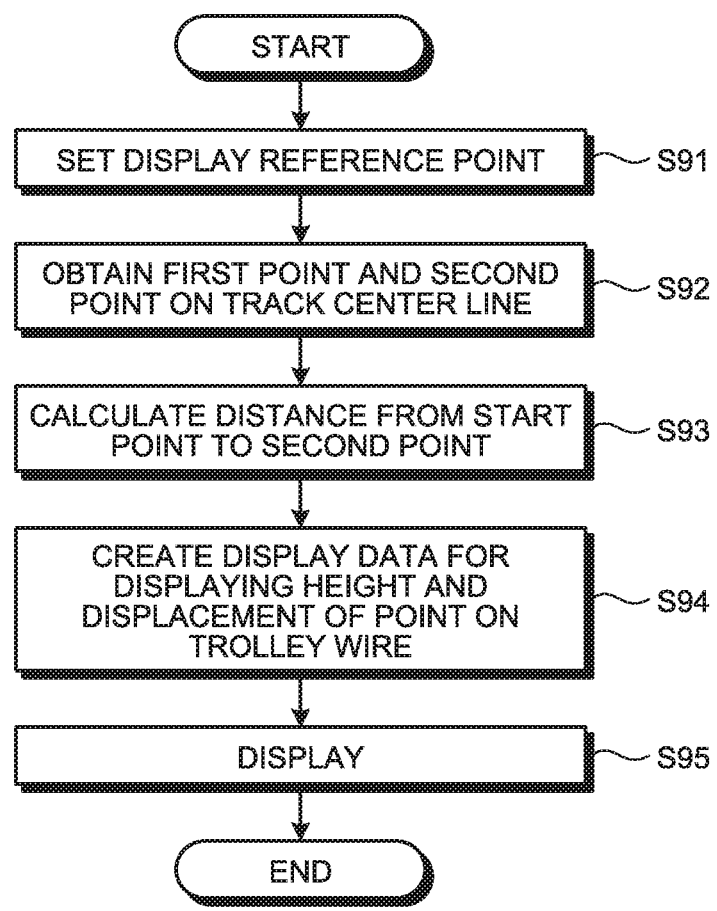
FIG. 27 is a flowchart illustrating a process performed by the trolley-wire display device according to the first embodiment for displaying the height and the displacement of the point on the trolley wire.

An operation of the trolley-wire display device 5 described above will be described with reference to a flowchart. FIG. 27 is a flowchart illustrating a process performed by the trolley-wire display device 5 according to the first embodiment for displaying the height 115 and displacement 117 of the point 113 on the trolley wire 102. The display reference point setting unit 51 of the trolley-wire display device 5 sets, for the point 113 on the trolley wire 102, the display reference point 204 of the point-group data 11 (Step S91). The display reference point 204 serves as a positional reference used when the point 113 on the trolley wire 102 is displayed, the point 113 on the trolley wire 102 having the height 115 and the displacement 117 that are measured on the basis of a reference obtained from the rails 101 defining the track on which the train 111 runs.

The distance measurement unit 52 obtains the first point 205 and the second point 206 on the track center line 109, the first point 205 corresponding to the display reference point 204, the second point 206 corresponding to the point 113 on the trolley wire 102 (Step S92).

The distance measurement unit 52 calculates the first distance from the first point 205 to the second point 206 and calculates the third distance (Step S93). The third distance, which is a distance to the second point 206 from the positional start point used at the time of display, is obtained by adding the first distance to the second distance from the start point to the first point 205.

On the basis of the third distance from the start point to the second point 206 calculated by the distance measurement unit 52, the display control unit 53 creates the display data for displaying the height 115 and displacement 117 of the point 113 on the trolley wire 102 corresponding to the second point 206 (Step S94).

On the basis of the data of the display screen created by the display control unit 53, the display unit 54 displays the height 115 and displacement 117 of the point 113 on the trolley wire 102 (Step S95). Step S91, S92, S93, S94, and S95 correspond to a first step, a second step, a third step, a fourth step, and a fifth step, respectively.

Next, a hardware configuration of the trolley-wire display system 6 is described. In the trolley-wire measurement device 1 of the trolley-wire display system 6, the storage unit 10 is implemented by a memory. Each of the functions of the track measurement unit 20 defined by the rail detection unit 21 and the reference setting unit 22, the trolley-wire detection unit 30, and the height and displacement measurement unit 40 is implemented by a processing circuit. That is, the trolley-wire measurement device 1 includes a processing circuit to detect the rails 101 from the point-group data 11, derive the rail plane 106, the track center line 109, and the track center plane 110, detect the point 113 on the trolley wire 102 from the point-group data 11, and measure the height 115 and the displacement 117 of the point 113 on the trolley wire 102. The processing circuit may be dedicated hardware, or a memory and a Central Processing Unit (CPU) that executes a program stored in the memory.

Figure 28:
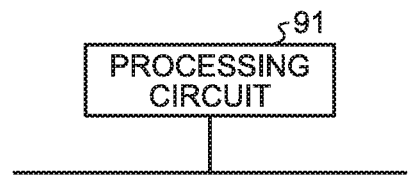
FIG. 28 is a diagram illustrating an example in which a processing circuit of the trolley-wire measurement device according to the first embodiment is defined by dedicated hardware.

FIG. 28 is a diagram illustrating an example in which the processing circuit of the trolley-wire measurement device 1 according to the first embodiment is defined by the dedicated hardware. When the processing circuit is the dedicated hardware, then for example, a single circuit, a combined circuit, a programmed processor, a parallel-programmed processor, an Application Specific Integrated Circuit (ASIC), a Field Programmable Gate Array (FPGA), or a combination thereof is equivalent to a processing circuit 91 illustrated in FIG. 28. Each of the functions of the track measurement unit 20, the trolley-wire detection unit 30, and the height and displacement measurement unit 40 may be implemented by the processing circuit 91, or these respective functions may be implemented together by the processing circuit 91.

Figure 29:
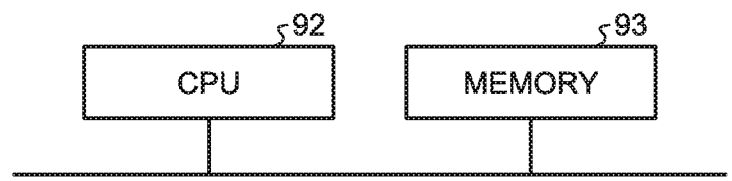
FIG. 29 is a diagram illustrating an example in which the processing circuit of the trolley-wire measurement device according to the first embodiment is defined by a CPU and a memory.

FIG. 29 is a diagram illustrating an example in which the processing circuit of the trolley-wire measurement device 1 according to the first embodiment is defined by a CPU and a memory. In a case where the processing circuit is defined by a CPU 92 and a memory 93, the functions of the track measurement unit 20, the trolley-wire detection unit 30, and the height and displacement measurement unit 40 are implemented by software, firmware, or a combination thereof. The software or the firmware is described as a program and stored in the memory 93. In the processing circuit, the CPU 92 reads and executes the program stored in the memory 93, thereby implementing the function of each unit. That is, the trolley-wire measurement device 1 includes the memory 93 that stores therein programs executed by the processing circuit to perform a step of detecting the rails 101 from the point-group data 11, a step of deriving the rail plane 106, a step of deriving the track center line 109, a step of deriving the track center plane 110, a step of detecting the point 113 on the trolley wire 102 from the point-group data 11, and a step of measuring the height 115 and the displacement 117 of the point 113 on the trolley wire 102. These programs are also regarded as causing a computer to execute the procedures and methods performed by the track measurement unit 20, the trolley-wire detection unit 30, and the height and displacement measurement unit 40. The CPU 92 can be a processing device, an arithmetic device, a microprocessor, a microcomputer, a processor, or a DSP (Digital Signal Processor). A nonvolatile or volatile semiconductor memory such as a RAM (Random Access Memory), a ROM (Read Only Memory), a flash memory, an EPROM (Erasable Programmable ROM), and an EEPROM (Electrically EPROM), a magnetic disk, a flexible disk, an optical disk, a compact disk, a mini disk, or a DVD (Digital Versatile Disc), and the like correspond to the memory 93. A memory that implements the storage unit 10 can be used as the memory 93.

The respective functions of the track measurement unit 20, the trolley-wire detection unit 30, and the height and displacement measurement unit 40 may be partially implemented by dedicated hardware, and be partially implemented by software or firmware. For example, the respective functions of the track measurement unit 20 and the trolley-wire detection unit 30 can be implemented by the processing circuit 91 that serves as the dedicated hardware, and the CPU 92 can read and execute the program stored in the memory 93 to implement the function of the height and displacement measurement unit 40.

In this manner, the processing circuit can implement the respective functions described above by the dedicated hardware, the software, the firmware, or the combination thereof.

Next, in the trolley-wire display device 5 of the trolley-wire display system 6, the display unit 54 is implemented by a monitor such as a Liquid Crystal Display (LCD). Each of the display reference point setting unit 51, the distance measurement unit 52, and the display control unit 53 is implemented by a processing circuit. As in the trolley-wire measurement device 1, the processing circuit in the trolley-wire display device 5 is implemented by a configuration illustrated in FIG. 28 or 29.

As described above, according to the present embodiment, the trolley-wire measurement device 1 detects the rails 101 from the point-group data 11 that is an aggregate of points obtained by measuring a target object three-dimensionally, derives the rail plane 106, the rack center line 109, and the track center plane 110 on the basis of the detected rails 101, and detects the point 113 on the trolley wire 102 from the point-group data 11 to measure a distance between the rail plane 106 and the point 113 on the trolley wire 102, as the height 115 of the point 113 on the trolley wire 102, and measure a distance between the track center plane 110 and the point 113 on the trolley wire 102, as the displacement 117 of the point 113 on the trolley wire 102. That is, the trolley-wire measurement device 1 can detect the rails 101 and the point 113 on the trolley wire 102 from the same point-group data 11, and can measure the height 115 and the displacement 117 of the point 113 on the trolley wire 102 on the basis of the reference set on the track, that is, on the basis of the detected rails 101. Thus, since the relative positions of the rails 101 and the point 113 on the trolley wire 102 are accurate, the trolley-wire measurement device 1 can accurately measure the height 115 and the displacement 117 of the point 113 on the trolley wire 102.

Further, since the trolley-wire measurement device 1 detects the rails 101 and the point 113 on the trolley wire 102 from the same point-group data 11 and uses the detected rails 101 and the detected point 113, the trolley-wire measurement device 1 can accurately measure the height 115 and the displacement 117 of the point 113 on the trolley wire 102 even when a vehicle on which the measuring device having generated the point-group data 11 is mounted sways or oscillates during the three-dimensional measurement, or when the track is curved.

Furthermore, when the point-group data 11 includes the point-group data regarding a plurality of tracks, the trolley-wire measurement device 1 can measure the height and the displacement of a point on a trolley wire for the respective tracks in the same manner, and thus can measure the height and the displacement of a point on a trolley wire for each of the parallel tracks or each of the main and side tracks at the crossover. The trolley-wire measurement device 1 can efficiently measure the height and the displacement of a point on a trolley wire on a plurality of tracks.

Furthermore, according to the present embodiment, in the trolley-wire display device 5, the height 115 and displacement 117 of the point 113 on the trolley wire 102 measured by the trolley-wire measurement device 1 are displayed in association with a distance serving as a reference set on a track, that is, in the present embodiment, in association with a distance from the kilo marker to the second point 206 corresponding to the point 113 on the trolley wire 102. As a result, a person in charge of maintenance in the railway company can recognize the state of the trolley wire 102 on a kilometer basis at the site of the maintenance work.

The trolley-wire display device 5 detects the kilo marker which is a reference shape, from the same point-group data 11 as that used when the point 113 on the trolley wire 102 is detected by the trolley-wire measurement device 1, and uses the detected kilo marker. As a result, the trolley-wire display device 5 can accurately display the height 115 and displacement 117 of the point 113 on the trolley wire 102 relative to the distance from the kilo marker with reference to the kilo marker.

Furthermore, the trolley-wire display device 5 can accurately display the positional relation of the plurality of trolley wires 102. Accordingly, the user can easily recognize the positional relation of the plurality of trolley wires 102.

Second Embodiment

In the trolley-wire display device 5 of the first embodiment, the display reference point setting unit 51 automatically sets the display reference point 204. In a second embodiment, a case where a user manually sets the display reference point 204 will be described.

Figure 30:
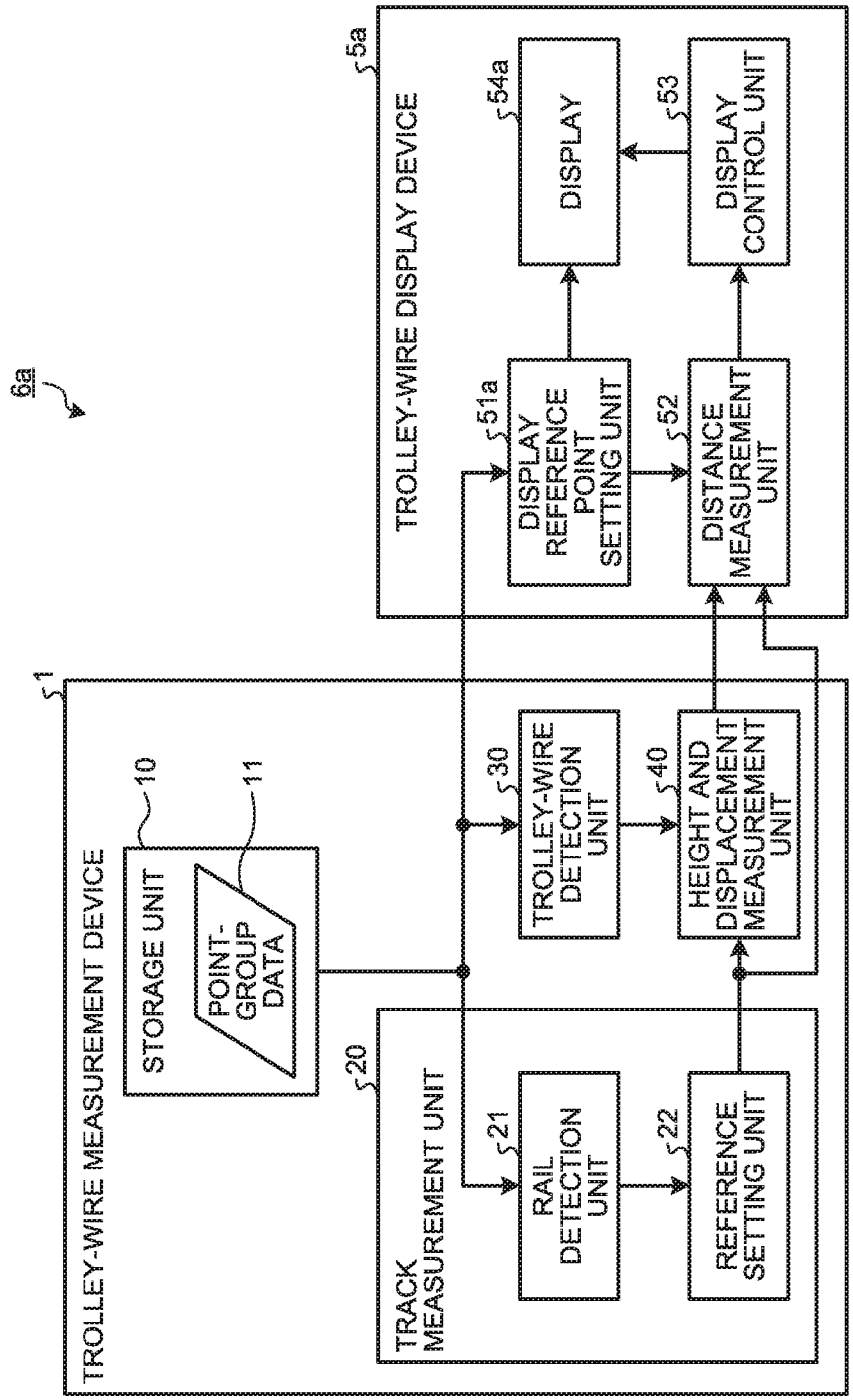
FIG. 30 is a block diagram illustrating a configuration example of a trolley-wire display system according to a second embodiment.

FIG. 30 is a block diagram illustrating a configuration example of a trolley-wire display system 6a according to the second embodiment. Unlike the trolley-wire display system 6 illustrated in FIG. 1, the trolley-wire display system 6a includes a trolley-wire display device 5a instead of the trolley-wire display device 5. In the trolley-wire display device 5a, the user sets the display reference point 204. The trolley-wire display device 5a includes a display reference point setting unit 51a, the distance measurement unit 52, the display control unit 53, and a display unit 54a.

The display reference point setting unit 51a sets the display reference point 204 among the point-group data 11. The display reference point 204 serves as a positional reference used when the point 113 on the trolley wire 102 is displayed, the point 113 on the trolley wire 102 having the height 115 and the displacement 117 that are measured on the basis of a reference obtained from the rails 101 that define the track on which the train 111 runs. Specifically, the display reference point setting unit 51a sets, as the display reference point 204, a point specified by the user from among the point group 104 contained in the point-group data 11.

Figure 31:
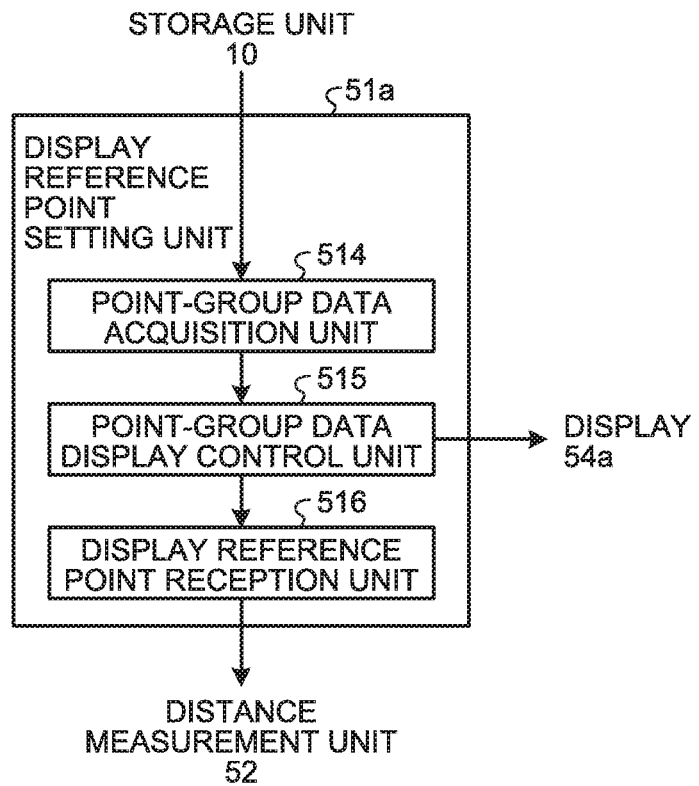
FIG. 31 is a block diagram illustrating a configuration example of a display reference point setting unit according to the second embodiment.
Figure 32:
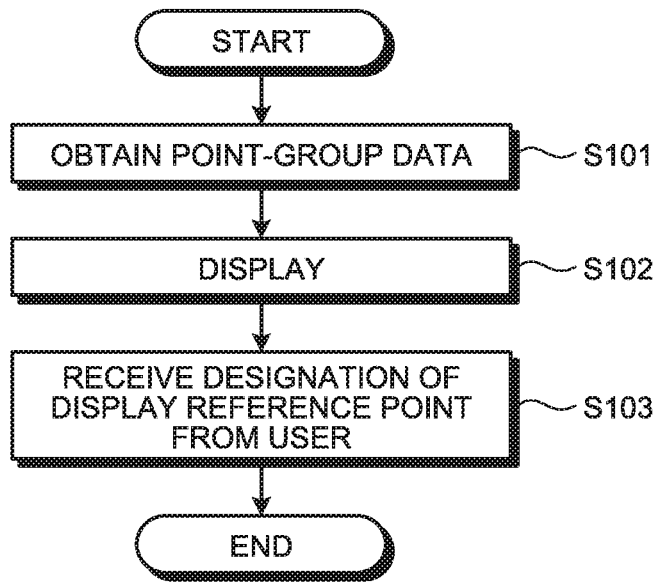
FIG. 32 is a flowchart illustrating a process for setting a display reference point in the display reference point setting unit according to the second embodiment.

FIG. 31 is a block diagram illustrating a configuration example of the display reference point setting unit 51a according to the second embodiment. The display reference point setting unit 51a includes a point-group data acquisition unit 514, a point-group data display control unit 515, and a display reference point reception unit 516. FIG. 32 is a flowchart illustrating a process for setting the display reference point 204 in the display reference point setting unit 51a according to the second embodiment.

The point-group data acquisition unit 514 obtains the point-group data 11 from the storage unit 10 of the trolley-wire measurement device 1 (Step S101). The point-group data display control unit 515 displays on the display unit 54a the point-group data 11 obtained by the point-group data acquisition unit 514 (Step S102). The point-group data display control unit 515 may display the point-group data 11 on another display (not illustrated) rather than on the display unit 54a. The display reference point reception unit 516 receives designation from the user for setting as a display reference point a single arbitrary point among each point group 104 contained in the point-group data 11 displayed on the display unit 54a (Step S103). The point of the point group 104, which is designated by the user as the display reference point 204, is output to the distance measurement unit 52 by the display reference point reception unit 516.

In the trolley-wire display device 5a, operations of the distance measurement unit 52 and the display control unit 53 are similar to those in the first embodiment. In addition to the function of the display 54 according to the first embodiment, the display unit 54a displays the point-group data 11 under the control of the point-group data display control unit 515 of the display reference point setting unit 51a.

Regarding a hardware configuration of the trolley-wire display device 5a, the display unit 54a is implemented by a monitor such as an LCD. The display reference point setting unit 51a includes an interface portion which actually receives an operation of the user, and the interface portion is implemented by a mouse, a keyboard, and the like. Other portions of the display reference point setting unit 51a than the interface portion, the distance measurement unit 52, and the display control unit 53 are implemented by processing circuits. Similarly to the trolley-wire display device 5, the processing circuit in the trolley-wire display device 5a is implemented by a configuration illustrated in FIG. 28 or 29.

As described above, according to the present embodiment, the trolley-wire display device 5a allows the user to set the display reference point 204. Accordingly, the trolley-wire display device 5a can display the height 115 and displacement 117 of the point 113 on the trolley wire 102 with reference to a position of, for example, a railway structure which cannot be set as a reference shape model.

Third Embodiment

In a third embodiment, the display reference point 204 is set on the basis of positional information on a railway structure obtained from outside.

Figure 33:
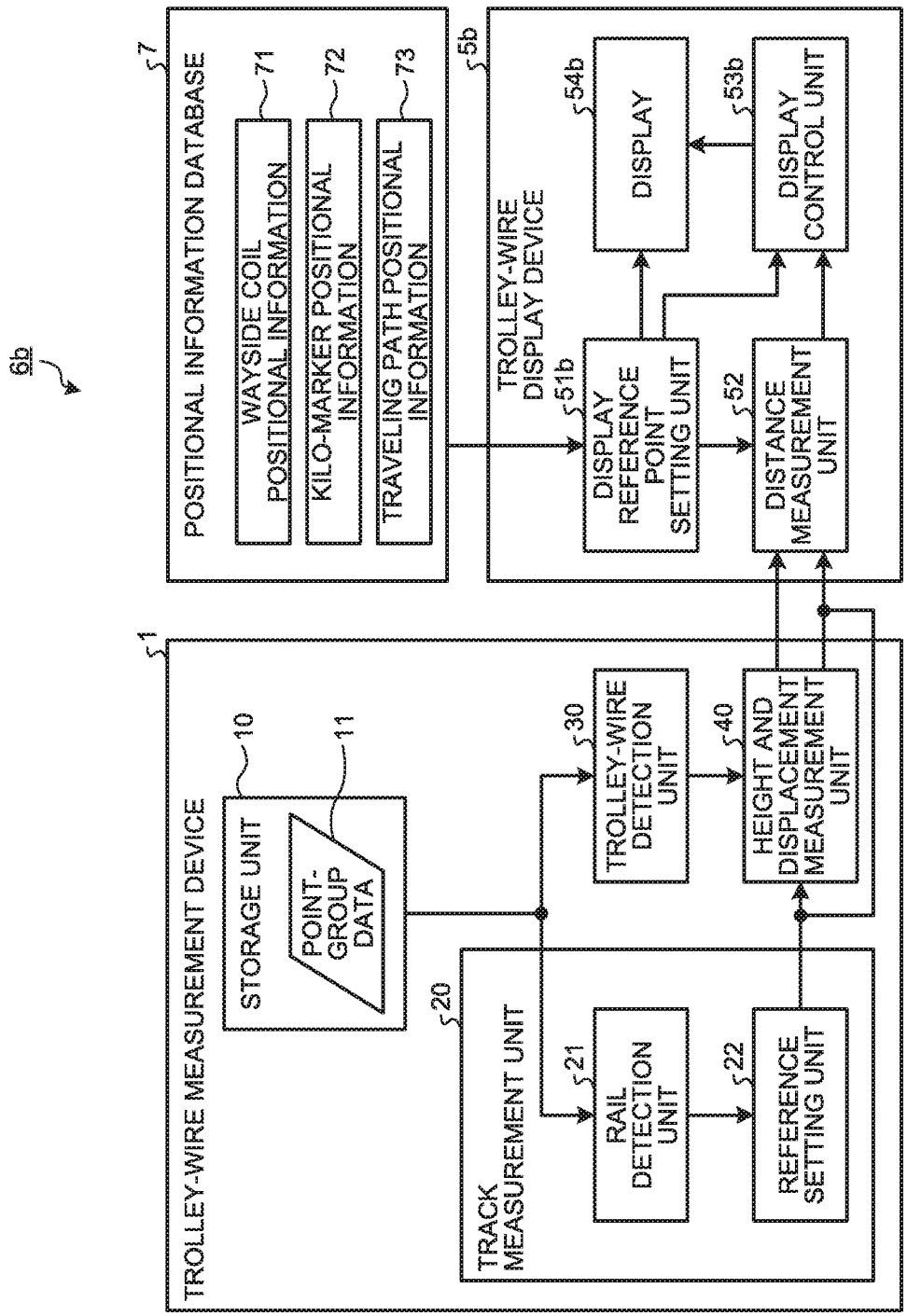
FIG. 33 is a block diagram illustrating a configuration example of a trolley-wire display system according to a third embodiment.

FIG. 33 is a block diagram illustrating a configuration example of a trolley-wire display system 6b according to the third embodiment. Unlike the trolley-wire display system 6, the trolley-wire display system 6b includes a trolley-wire display device 5b instead of the trolley-wire display device 5, and further includes a positional information database 7.

The positional information database 7 holds wayside-coil positional information 71, kilo-marker positional information 72, and traveling path positional information 73. The wayside-coil positional information 71 is information indicating a position where a wayside-coil is installed. The position of the wayside coil may be indicated in terms of a distance from a start point of a train line or may be indicated in a form of three-dimensional coordinates. The kilo-marker positional information 72 is information indicating a position where the kilo marker is installed. The position of the kilo marker may be indicated in terms of the distance from the start point of the train line or may be indicated in the form of the three-dimensional coordinates. The traveling path positional information 73 is information indicating a traveling route on which the train 111 actually runs. The traveling route is indicated, for example, in the form of the three-dimensional coordinates. The wayside-coil positional information 71 and the kilo-marker positional information 72 included in the positional information database 7 are examples, and the positional information database 7 may hold positional information on railway structures such as stations, railway crossings, bridges, and tunnels.

The trolley-wire display device 5b sets the display reference point 204, using, for example, the positional information on the railway structure held by the positional information database 7. The trolley-wire display device 5b includes a display reference point setting unit 51b, the distance measurement unit 52, a display control unit 53b, and a display unit 54b.

The display reference point setting unit 51b obtains one or more pieces of positional information from the positional information database 7. The display reference point setting unit 51b then sets the display reference point 204, using the obtained positional information.

Figure 34:
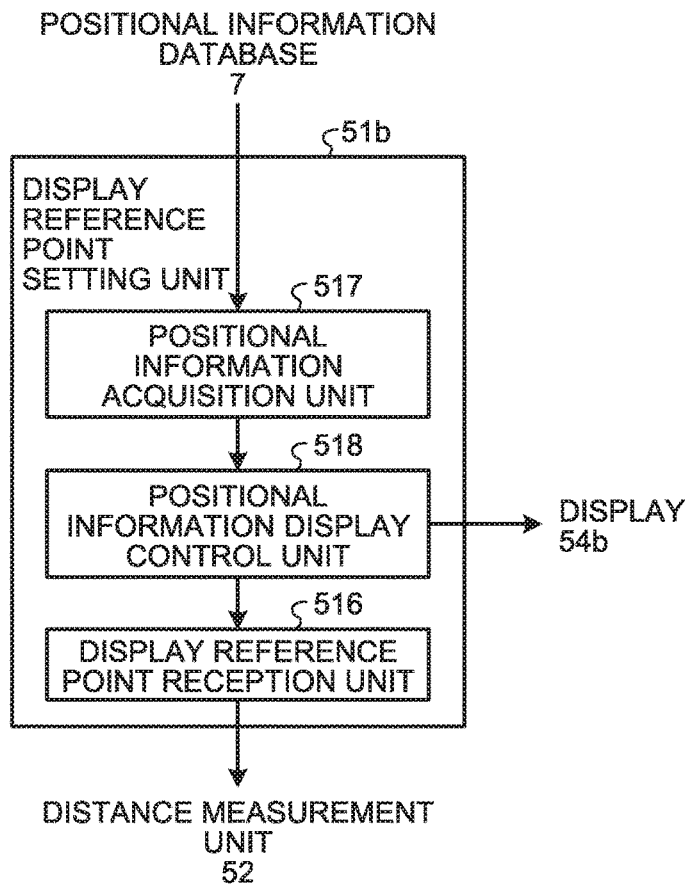
FIG. 34 is a block diagram illustrating a configuration example of a display reference point setting unit according to the third embodiment.
Figure 35:
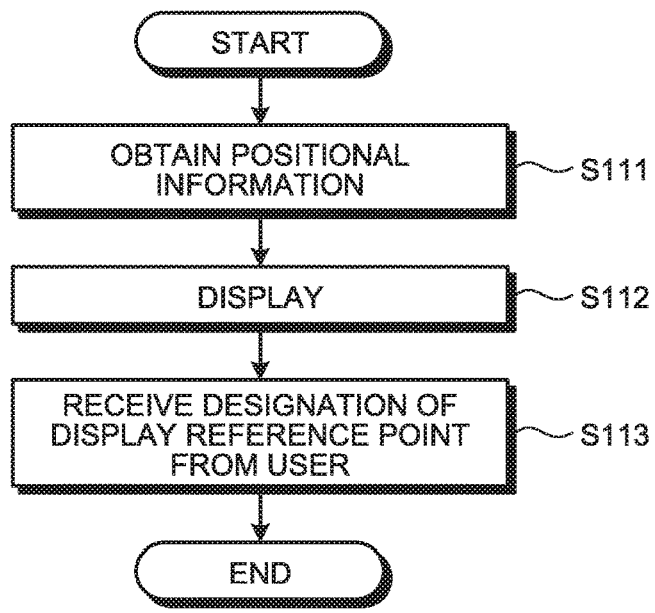
FIG. 35 is a flowchart illustrating a process for setting a display reference point in the display reference point setting unit according to the third embodiment.

FIG. 34 is a block diagram illustrating a configuration example of the display reference point setting unit 51b according to the third embodiment. The display reference point setting unit 51b includes a positional information acquisition unit 517, a positional information display control unit 518, and the display reference point reception unit 516. FIG. 35 is a flowchart illustrating a process for setting the display reference point 204 in the display reference point setting unit 51b according to the third embodiment.

The positional information acquisition unit 517 obtains the positional information from the positional information database 7 (Step S111). The positional information display control unit 518 displays on the display unit 54b the positional information obtained by the positional information acquisition unit 517 (Step S112). The positional information display control unit 518 may display the positional information on another display (not illustrated) rather than on the display unit 54b. The display reference point reception unit 516 receives designation from the user for setting, as a display reference point, a single arbitrary point among each point group 104 contained in the positional information displayed on the display unit 54b (Step S113). The point of the point group 104, which is designated by the user as the display reference point 204, is output to the distance measurement unit 52 by the display reference point reception unit 516.

The display reference point setting unit 51b outputs to the display control unit 53b the positional information obtained from the positional information database 7. The display reference point setting unit 51b may be configured to have the representative point extraction unit 513 instead of the positional information display control unit 518 and the display reference point reception unit 516. Regarding the display reference point setting unit 51b, the display reference point 204 may be automatically set as in the first embodiment, and the user may manually set the display reference point 204 as in the second embodiment.

In the trolley-wire display device 5b, an operation of the distance measurement unit 52 is similar to that in the first embodiment.

In addition to the function of the display control unit 53 according to the first embodiment, the display control unit 53b creates display data including the positional information obtained from the display reference point setting unit 51b.

In addition to the function of the display 54 according to the first embodiment, the display unit 54b displays the positional information under control of the positional information display control unit 518 of the display reference point setting unit 51b.

FIG. 36 is a diagram illustrating an example of a display screen provided by the trolley-wire display device 5b according to the third embodiment for displaying the height 115 and displacement 117 of the point 113 on the trolley wire 102. The display screen of FIG. 36 differs from the display screen of FIG. 25 displayed by the trolley-wire display device 5 according to the first embodiment in that the display screen of FIG. 26 further provides positional information on a position where the wayside coil is installed on the basis of the wayside-coil positional information 71. In this way, the trolley-wire display device 5b can additionally display the positional information of the railway structure such as the wayside coil when displaying the height 115 and displacement 117 of the point 113 on the trolley wire 102.

FIG. 37 is a diagram illustrating another example of a display screen provided by the trolley-wire display device 5b according to the third embodiment for displaying the height 115 and displacement 117 of the point 113 on the trolley wire 102. In FIG. 37, the horizontal axis of the graph is a measurement travelling distance post of the train 111 based on the traveling path positional information 73. The graph of FIG. 37 further provides positional information of a position where the kilo marker is installed on the basis of the kilo-marker positional information 72. In this way, the trolley-wire display device 5b can additionally display the plurality of pieces of positional information when displaying the height 115 and displacement 117 of the point 113 on the trolley wire 102.

Regarding a hardware configuration of the trolley-wire display device 5b, the display unit 54b is implemented by a monitor such as an LCD. The display reference point reception unit 516 of the display reference point setting unit 51b includes an interface portion which actually receives an operation of the user, and the interface portion is implemented by a mouse, a keyboard, and the like. Other portions of the display reference point setting unit 51a than the interface portion of the display reference point reception unit 516, the distance measurement unit 52, and the display control unit 53b are implemented by processing circuits. Similarly to the trolley-wire display device 5, the processing circuit in the trolley-wire display device 5b is implemented by a configuration illustrated in FIG. 28 or 29.

As described above, according to the present embodiment, in the trolley-wire display device 5b, the height 115 and the displacement 117 of the point 113 on the trolley wire 102 measured by the trolley-wire measurement device 1 are displayed in association with the positional information on the wayside coil, the kilometers, or the like. Accordingly, the trolley-wire display device 5b, which displays the railway structure and the like when displaying the height 115 and displacement 117 of the point 113 on the trolley wire 102, can achieve various displays. Furthermore, a person in charge of maintenance can recognize the state of the trolley wire 102 by using various railway structures as a marker at the site of maintenance work.

Fourth Embodiment

Generally, a normal range of a height and displacement of a trolley wire is specified. In a fourth embodiment, a case where the normal range as well as the height and displacement of the trolley wire is displayed will be described. The fourth embodiment will be described using, by way of example, the trolley-wire display system 6 according to the first embodiment as the description of the fourth embodiment applies to any one of the first embodiment to the third embodiment.

In the trolley-wire display system 6, a user sets, in advance, first and second thresholds in the display control unit 53 of the trolley-wire display device 5. The first threshold is a normal range of the height 115 of the point 113 on the trolley wire 102. The second threshold is a normal range of the displacement 117 of the point 113 on the trolley wire 102. This is because the normal range may vary depending on a railway company or a standard of a train line.

When creating display data described in the first embodiment, the display control unit 53 adds, to the display data, information on the normal range of the height 115 of the point 113 on the trolley wire 102 and on the normal range of the displacement 117 of the point 113 on the trolley wire 102. As a result, the display control unit 53 creates the display data containing the information on the normal ranges. The display control unit 53 performs control for display on the display unit 54 on the basis of the display data having the added information on the normal range of the height 115 of the point 113 of the trolley wire 102 and on the normal range of the displacement 117 of the point 113 of the trolley wire 102. Thus, a user who has viewed the display screen of the display unit 54 can easily recognize whether or not the height 115 and the displacement 117 of the point 113 on the trolley wire 102 are normal.

Furthermore, in a case where one or both of the height 115 of the point 113 on the trolley wire 102 and the displacement 117 of the point 113 on the trolley wire 102 are outside the normal ranges, the display control unit 53 may display the point outside the normal range in a different way from the other points. For example, the point outside the normal range may be highlighted by the display control unit 53.

FIG. 38 is a diagram illustrating an example of a display screen provided by the trolley-wire display device 5 according to the fourth embodiment for displaying the height 115 and displacement 117 of the point 113 on the trolley wire 102. In FIG. 38, the normal ranges of the height 115 and the displacement 117 of the point 113 on the trolley wire 102 are displayed together with the height 115 and the displacement 117. The graph of the displacement 117 in FIG. 38 illustrates an example in which dotted lines added at positions of ±0.25 define the normal range therebetween. The graph of the height 115 in FIG. 38 illustrates an example in which a dotted line is added at a position of 4.55 defining a lower limit of the normal range and a dotted line is added at a position of 5.4 defining an upper limit of the normal range.

Furthermore, FIG. 38 illustrates the displacement 117 with a point outside the normal range being highlighted. When creating the display data, the display control unit 53 creates display data for highlighting a third point that is the point 113 outside the normal range. Specifically, in a case where there is a point 113 on the trolley wire 102 that exceeds at least one of the first threshold and the second threshold, the display control unit 53 creates the display data for highlighting this point 113. FIG. 38 illustrates an example in which the diagram of the displacement includes a highlighted portion larger than 0.25 and the diagram of the height includes a highlighted portion smaller than 4.55. As a result, when the height 115 or displacement 117 of the point 113 on the trolley wire 102 is abnormal, the user who has viewed the display screen of the display unit 54 can easily recognize such an abnormal condition.

Figures 39, 40:
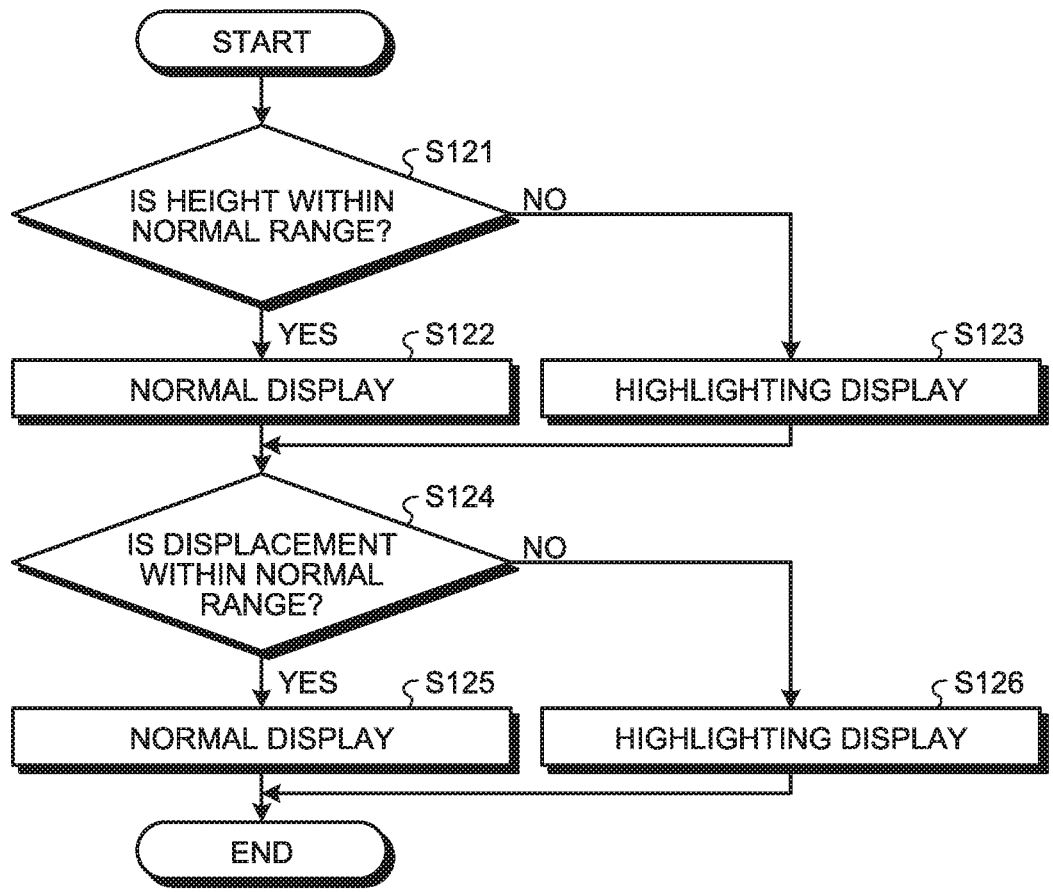
FIG. 39 is a flowchart illustrating a process performed by a display control unit according to the fourth embodiment for creating display data.
FIG. 40 is a diagram illustrating an example of a table-format display data created by the display control unit according to the fourth embodiment.

FIG. 39 is a flowchart illustrating a process performed by the display control unit 53 according to the fourth embodiment for creating the display data. As in the first embodiment, the display control unit 53 creates the display data displaying the height 115 and the displacement 117 of the point 113 on the trolley wire 102 at positions located away from a start point by a distance measured by the distance measurement unit 52.

In a case where a height 115 of a point 113 on the trolley wire 102 falls within the normal range (YES at Step S121), the display control unit 53 creates the display data for normally displaying this point 113 in the graph illustrating the height 115 (Step S122). In a case where a height 115 of a point 113 on the trolley wire 102 is outside the normal range (NO at Step S121), the display control unit 53 creates the display data for highlighting this point in the graph illustrating the height 115 (Step S123). In a case where a displacement 117 of a point 113 on the trolley wire 102 falls within the normal range (YES at Step S124), the display control unit 53 creates the display data for normally displaying this point 113 in the graph illustrating the displacement 117 (Step S125). In a case where a displacement 117 of a point 113 on the trolley wire 102 is outside the normal range (NO at Step S124), the display control unit 53 creates the display data for highlighting this point in the graph illustrating the displacement 117 (Step S126).

In a case where there is a point that is to be highlighted, that is, in a case where there is a point 113 on the trolley wire 102 having the height 115 and the displacement 117 one or both of which is outside the normal range, the display control unit 53 may create display data for displaying information on the point 113 at issue in a table format. FIG. 40 is a diagram illustrating an example of table-format display data created by the display control unit 53 according to the fourth embodiment. In FIG. 40, the "distance" indicates a distance value on the horizontal axis illustrated in FIG. 38, the "height" indicates a value in the lower diagram of FIG. 38, and the "displacement" indicates a value in the upper diagram of FIG. 38. In FIG. 40, the reference sign "-" indicates that the value is within the normal range. Alternatively, display such as "OK" may be used in place of the sign "-".

The display control unit 53 performs control for creating the two pieces of display data of the display screens illustrated in FIGS. 38 and 40, and displaying, on the display unit 54, a user's selected one of the two pieces of display data or the two pieces of display data alternately.

Furthermore, the display control unit 53 may display other ranges in addition to the normal range illustrated in FIG. 38. In general, the trolley wire 102 is installed in not a straight line but a zigzag shape, that is, a shape having the displacement 117 relative to the track center line 109. This is because, if the trolley wire 102 were installed in a linear shape similar to the track center line 109, a pantograph of the train 111 would contact the trolley wire 102 only at a specific portion thereof; hence, only the contact portion would be worn. That is why the trolley wire 102 is installed in the shape having the displacement 117 so as not to wear only the specific position of the pantograph of the train 111.

When the height and displacement of the trolley wire 102 is within the normal range illustrated in FIG. 38, the user can determine that the trolley wire 102 is normal. However, even if the width of the displacement is small, a problem occurs on the part of the train 111. To address this problem, therefore, the display control unit 53 may add a display for determining whether or not the displacement 117 of the trolley wire 102 is kept equal to or more than a certain value. FIG. 41 is a diagram illustrating another example of a display screen provided by the trolley-wire display device 5 according to the fourth embodiment for displaying the height 115 and the displacement 117 of the point 113 on the trolley wire 102. Unlike FIG. 38, FIG. 41 illustrates the graph of the displacement 117 providing an example in which dotted lines are added at positions of ±0.1. When the displacement 117 of the trolley wire 102 displayed in graph form has the vertexes between +0.1 and +0.25 or between −0.25 and −1.0, the user determines that the displacement 117 of the trolley wire 102 is normal. When the vertexes are between ±0.1, the user determines that the displacement 117 of the trolley wire 102 is abnormal. It is noted that information on the position of ±0.1 used to determine whether the displacement 117 of the trolley wire 102 is normal or abnormal is set in advance by an user in the display control unit 53 of the trolley-wire display device 5, as is the normal range. In FIG. 41, the graph of the height 115 is the same as that in FIG. 38.

As described above, according to the present embodiment, when displaying the height 115 and displacement 117 of the point 113 on the trolley wire 102, the trolley-wire display device 5 displays the normal range as well. Furthermore, the trolley-wire display device 5 highlights the point outside the normal range. As a result, the height 115 or displacement 117 of the point 113 on the trolley wire 102 is abnormal, the user who has viewed the display screen of the display unit 54 can easily recognize such an abnormal condition, as compared to the first embodiment.

Fifth Embodiment

In a fifth embodiment, a case where the display control unit 53 creates, as new display data, a plurality of pieces of display data which are superposed on one another will be described. The fifth embodiment will be described with reference to, by way of example, the trolley-wire display system 6 according to the first embodiment as the description of the fifth embodiment can apply to any one of the first embodiment to the fourth embodiment.

The assumption is that the display control unit 53 of the trolley-wire display device 5 of the trolley-wire display system 6 in the fifth embodiment include a storage unit which can hold display data created in the past. In FIG. 1, an additional storage unit may be provided within the trolley-wire display device 5. The display control unit 53 uses the plurality of pieces of display data to thereby create new display data that enables: detection of a tendency of change from the past in the height 115 and displacement 117 of the point 113 on the trolley wire 102; or detection of low reliable data resulting from unexpected factors on the height 115 and displacement 117 of the point 113 on the trolley wire 102.

FIG. 42 is a diagram illustrating an example of a display screen provided by the trolley-wire display device 5 according to the fifth embodiment for displaying the height 115 and displacement 117 of the point 113 on the trolley wire 102 on the basis of the new display data defined by the plurality of superposed pieces of display data. In FIG. 42, the graph of the displacement 117 of the point 113 on the trolley wire 102 illustrates an example in which only one point is displayed away from the other points. In this graph, the point displayed at a remote position is highlighted as in FIG. 38 described in the fourth embodiment.

The display control unit 53 holds display data created in the past. When, among the plurality of superposed pieces of display data, there is a fourth point displayed more than a specified third threshold away from the display position of points of the other pieces of display data located at the same distance as the fourth point, the display control unit 53 creates display data for highlighting the fourth point.

Figure 43:
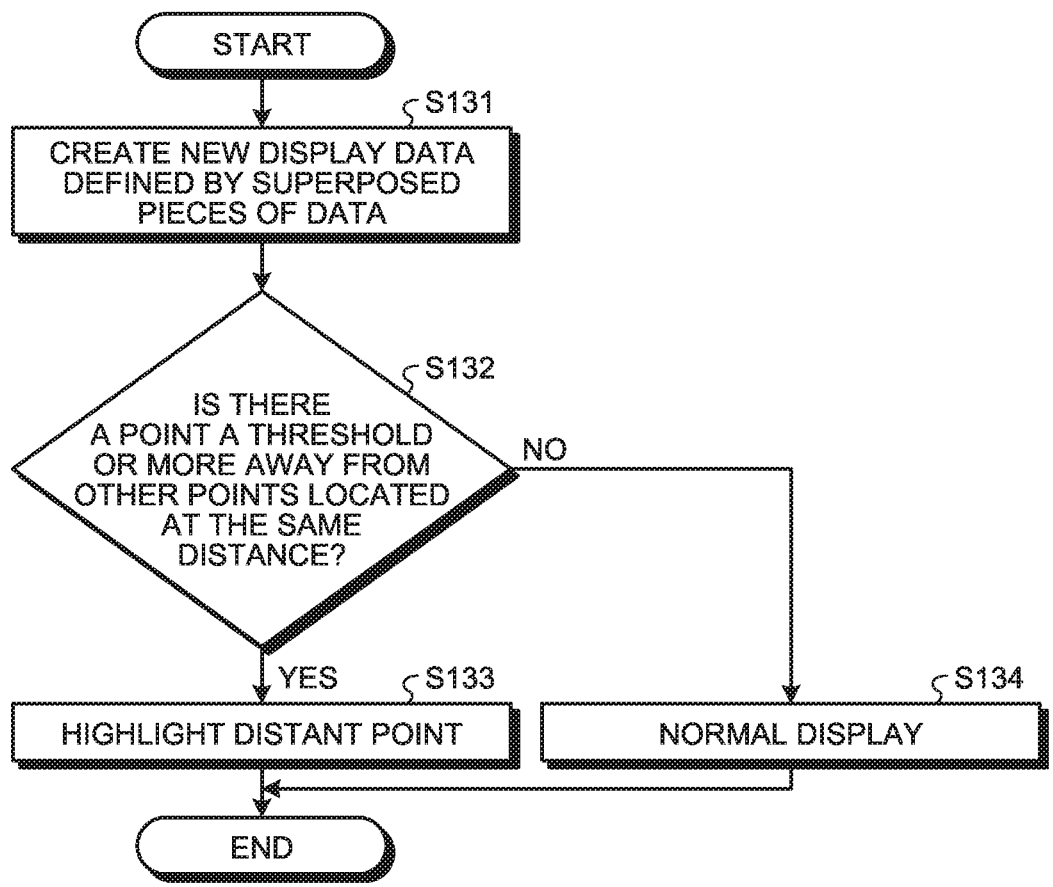
FIG. 43 is a flowchart illustrating a process performed by a display control unit according to the fifth embodiment for creating display data.

FIG. 43 is a flowchart illustrating a process performed by the display control unit 53 according to the fifth embodiment for creating the display data. As in the first embodiment, the display control unit 53 creates the display data displaying the height 115 and the displacement 117 of the point 113 on the trolley wire 102 at locations away from a start point by a distance measured by the distance measurement unit 52.

The display control unit 53 creates new display data defined by the plurality of superposed pieces of display data including the display data created in the past (Step S131). The display control unit 53 checks whether or not there is a point 113 displayed the specified threshold or more away from the display position of points 113 of the other pieces of display data located the same distance as the point 113 (Step S132). In a case where there is the fourth point that is the point 113 the third threshold or more away (YES at Step S132), the display control unit 53 highlights the fourth point (Step S133). In a case where there is no point 113 the third threshold or more away (NO at Step S132), the display control unit 53 normally displays all the points 113 (Step S134).

In a case where there is the point 113 that is to be highlighted, that is, in a case where a point 113 on the trolley wire 102 is the third threshold or more away from points 113 of the other pieces of display data in terms of one or both of the height 115 and the displacement 117, the display control unit 53 may create display data for displaying the information indicating the point 113 in a table format as in the fourth embodiment. In this case, the table format may be the same as that in FIG. 40 as described in the fourth embodiment, and a content that is to be displayed may be only information on the fourth point.

As described above, according to the present embodiment, the trolley-wire display device 5 creates, as the new display data, the plurality of superposed pieces of display data including the display data created in the past and displays the created display data. As a result, in a case where a point of certain display data is at a position different from points of the other display data located at the same distance as the point, the trolley-wire display device 5 can determine that the point is low reliable data and highlight the point.

The structures illustrated in the above embodiment indicate exemplary contents of the present invention and can be combined with other known technique. Further, the structures illustrated in the embodiment can be partially omitted and changed without departing from the scope of the present invention.

REFERENCE SIGNS LIST 1 trolley-wire measurement device; 5, 5a, 5b trolley-wire display device; 6, 6a, 6b trolley-wire display system; 10 storage unit; 11 point-group data; 20 track measurement unit; 21 rail detection unit; 22 reference setting unit; 30 trolley-wire detection unit; 40 height and displacement measurement unit; 51, 51a, 51b display reference point setting unit; 52 distance measurement unit; 53, 53b display control unit; 54, 54a, 54b display; 71 wayside-coil positional information; 72 kilo-maker positional information; 73 traveling path positional information.

The invention claimed is:

1. A trolley-wire display device comprising:
a display reference point setter to set a display reference point of point-group data for each point on a trolley wire having a height and a displacement that are measured on the basis of a reference obtained from rails defining a track on which a train runs, the display reference point serving as a positional reference used when each point is displayed, the point- group data being an aggregate of points obtained by three-dimensional measurement of a target object, the rails being two in number, the reference obtained from the rails including a track center line located at a center between the two rails and on a rail plane including surfaces of the two rails, the surfaces of the two rails contacting the train;
a distance measurer to obtain first and second points on the track center line, calculate a first distance, and calculate a third distance on a basis of the first distance and a second distance, the first point corresponding to the display reference point, the second point corresponding to each point on the trolley wire, the first distance being a distance from the first point to each second point, the second distance being a distance from a positional start point used when each point on the trolley wire is displayed, to the first point, the third distance being a distance from the start point to each second point; and
a display controller to create, on the basis of the third distance, display data for displaying a height and a displacement of each point on the trolley wire corresponding to the second point.

2. The trolley-wire display device according to claim 1, wherein
the display reference point setter detects a specified railway structure from the point-group data, extracts a single point from among points contained in the detected railway structure, and sets the extracted single point as the display reference point.

3. The trolley-wire display device according to claim 1, wherein
the display reference point setter sets, as the display reference point, a point specified by a user from the points contained in the point-group data.

4. The trolley-wire display device according to claim 1, wherein
the display reference point setter sets the display reference point, using positional information on a railway structure.

5. The trolley-wire display device according to claim 4, wherein
the display controller creates the display data containing the positional information on the railway structure.

6. The trolley-wire display device according to claim 1, wherein
the display controller creates display data for displaying the height and the displacement of each point on the trolley wire corresponding to the second point, with reference to the track center line.

7. The trolley-wire display device according to claim 1, wherein
the display controller creates display data for displaying, in three-dimensional coordinates, the height and the displacement of each point on the trolley wire obtained by three- dimensional measurement and the track center line.

8. The trolley-wire display device according to claim 1, wherein
the display controller creates display data containing a first threshold that is a specified range of the height and a second threshold that is a specified range of the displacement.

9. The trolley-wire display device according to claim 8, wherein
when there is a third point that is a point on the trolley wire, the third point exceeding at least one of the first threshold and the second threshold, the display controller creates display data for highlighting the third point.

10. The trolley-wire display device according to claim 1, wherein
the display controller holds display data created in the past, and when, among the plurality of superposed pieces of display data, there is a fourth point displayed more than a specified third threshold away from a display position of points of other pieces of display data located at the same distance as the fourth point, the display controller creates display data for highlighting the fourth point.

11. The trolley-wire display device according to claim 8, wherein
the display controller outputs information on the highlighted point in a table format.

12. The trolley-wire display device according to claim 1, further comprising;
a display to display the display data.

13. A trolley-wire display system comprising:
a rail detector to detect, from point-group data, rails defining a track on which a train runs, the point-group data being an aggregate of points obtained by three-dimensional measurement of a target object;
a reference setter to set a reference for measuring a height and a displacement of a point on a trolley wire on a basis of the detected rails;
a trolley-wire detector to detect a point on the trolley wire from the point- group data;
a height and displacement measurer to measure a height and a displacement of a point on the trolley wire by using the reference;
a display reference point setter to set a display reference point of the point- group data for each point on the trolley wire having the height and the displacement that are measured by the height and displacement measurer, the display reference point serving as a positional reference used when each point is displayed, the rails being two in number, the reference set by the reference setter including a track center line located at a center between the two rails and on a rail plane including surfaces of the two rails contacting the train;

a distance measurer to obtain first and second points on the track center line, calculate a first distance, and calculate a third distance on the basis of a second distance and the first distance, the first point corresponding to the display reference point, the second point corresponding to each point on the trolley wire, the first distance being a distance from the first point to each second point, the second distance being a distance from a positional start point used when each point on the trolley wire is displayed, to the first point, the third distance being a distance from the start point to each second point; and a display controller to create, on the basis of the third distance, display data for displaying a height and a displacement of each point on the trolley wire corresponding to the second point.

14. A trolley-wire display data creation method comprising:

setting a display reference point of point-group data for each point on a trolley wire having a height and a displacement that are measured on the basis of a reference obtained from rails defining a track on which a train runs, the display reference point serving as a positional reference used when each point is displayed, the point-group data being an aggregate of points obtained by three-dimensional measurement of a target object, the rails being two in number, the reference obtained from the rails including a track center line located at a center between the two rails and on a rail plane including surfaces of the two rails, the surfaces of the two rails contacting the train obtaining first and second points on the track center line, the first point corresponding to the display reference point, the second point corresponding to each point on the trolley wire;

calculating a first distance from the first point to each second point and calculating a third distance on a basis of the first distance and a second distance from a positional start point used when each point on the trolley wire is displayed, to the first point, the third distance being a distance from the start point to each second point; and on the basis of the third distance, creating display data for displaying a height and a displacement of each point on the trolley wire corresponding to the second point.

15. The trolley-wire display data creation method according to claim 14, wherein setting the display reference point includes detecting a specified railway structure from the point-group data, extracts a single point from among points contained in the detected railway structure, and setting the extracted single point as the display reference point.

16. The trolley-wire display data creation method according to claim 14, wherein setting the display reference point includes setting, as the display reference point, a point specified by a user from the points contained in the point-group data.

17. The trolley-wire display data creation method according to claim 14, wherein setting the display reference point includes setting the display reference point, using positional information on a railway structure.

18. The trolley-wire display data creation method according to claim 17, wherein creating the display data includes creating the display data containing the positional information on the railway structure.

19. The trolley-wire display data creation method according to claim 14, wherein creating the display data includes creating display data for displaying the height and the displacement of each point on the trolley wire corresponding to the second point, with reference to the track center line.

20. The trolley-wire display data creation method according to claim 14, wherein creating the display data includes creating display data for displaying, in three-dimensional coordinates, the height and the displacement of each point on the trolley wire obtained by three-dimensional measurement and the track center line.

21. The trolley-wire display data creation method according to claim 14, wherein creating the display data includes creating display data containing a first threshold that is a specified range of the height and a second threshold that is a specified range of the displacement.

22. The trolley-wire display data creation method according to claim 21, wherein when there is a third point that is a point on the trolley wire, the third point exceeding at least one of the first threshold and the second threshold, creating the display data includes creating display data for highlighting the third point.

23. The trolley-wire display data creation method according to claim 14, wherein creating the display data includes holding display data created in the past, and when, among the plurality of superposed pieces of display data, there is a fourth point displayed more than a specified third threshold away from a display position of points of other pieces of display data located at the same distance as the fourth point, creating the display data includes creating display data for highlighting the fourth point.

24. The trolley-wire display data creation method according to claim 23, wherein creating the display data includes outputting information on the highlighted point in a table format.

25. The trolley-wire display data creation method according to claim 14, further comprising:

displaying the display data.

* * * * *